( 12 ) United States Patent
Sun et al.

(10) Patent No.: US 11,575,754 B2
(45) Date of Patent: Feb. 7, 2023

(54) COMMUNICATION METHOD AND COMMUNICATIONS APPARATUS

(71) Applicant: Huawei Technologies Co., Ltd., Shenzhen (CN)

(72) Inventors: Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 17/100,190

(22) Filed: Nov. 20, 2020

(65) Prior Publication Data

US 2021/0075864 A1  Mar. 11, 2021

Related U.S. Application Data

(63) Continuation of application No. PCT/CN2019/087827, filed on May 21, 2019.

(30) Foreign Application Priority Data

May 21, 2018 (CN) .......................... 201810491245.7

(51) Int. Cl.
H04W 28/02 (2009.01)
H04L 67/14 (2022.01)
(Continued)

(52) U.S. Cl.
CPC ......... H04L 67/14 (2013.01); H04W 28/0236 (2013.01); H04W 36/0011 (2013.01); H04W 36/30 (2013.01)

(58) Field of Classification Search
None
See application file for complete search history.

(56) References Cited

U.S. PATENT DOCUMENTS 8,036,608 B2 * 10/2011 Holm ................. H04L 65/4061
455/518
2013/0010597 A1 * 1/2013 Liu ....................... H04W 28/16
370/235
(Continued)

FOREIGN PATENT DOCUMENTS

CN 107018542 A 8/2017
CN 107548127 A 1/2018
(Continued)

OTHER PUBLICATIONS

3GPP TS 23.502 V15.1.0 "3rd Generation Partnership Project; Technical Specification Group Services and System Aspects; Procedures for the 5G System; Stage 2" (Year: 2018).*
(Continued)

Primary Examiner — Kodzovi Acolatse
(74) Attorney, Agent, or Firm — Conley Rose, P.C.

(57) ABSTRACT

In a communication method, a first access network device sends first information to a second access network device, where the first information is used to indicate that the first access network device has notified a core network device that a quality of service requirement of at least one quality of service flow cannot be met; the second access network device may send second information to the core network device, where the second information is used to notify the core network device that a quality of service requirement of a first quality of service flow in the at least one quality of service flow can be met, and the first quality of service flow is a quality of service flow that has been handed over from the first access network device to the second access network device.

25 Claims, 13 Drawing Sheets

(51) Int. Cl.
H04W 36/00 (2009.01)
H04W 36/30 (2009.01)

(56) References Cited

U.S. PATENT DOCUMENTS

| | | | |
|---|---|---|---|
| 2017/0208518 A1 | | 7/2017 | Shu et al. |
| 2017/0317894 A1 | | 11/2017 | Dao et al. |
| 2017/0359749 A1 | * | 12/2017 | Dao .................. H04L 47/2416 |
| 2018/0198867 A1 | | 7/2018 | Dao et al. |
| 2019/0357106 A1 | | 11/2019 | Ke et al. |
| 2020/0120570 A1 | * | 4/2020 | Youn .................. H04W 76/11 |
| 2020/0275302 A1 | | 8/2020 | Youn et al. |

FOREIGN PATENT DOCUMENTS

| | | | | |
|---|---|---|---|---|
| CN | 113086822 A | * | 7/2021 | ............. B66B 1/365 |
| EP | 2827635 A1 | | 1/2015 | |
| JP | 2019537334 A | | 12/2019 | |
| KR | 20170063872 A | | 6/2017 | |
| WO | 2017196161 A1 | | 11/2017 | |
| WO | 2018070689 A1 | | 4/2018 | |
| WO | WO-2019198960 A1 | * | 10/2019 | ............. H04L 47/24 |
| WO | WO-2019210966 A1 | * | 11/2019 | ........ H04W 28/0268 |

OTHER PUBLICATIONS

3GPP TS 23.203 V15.2.0, "3rd Generation Partnership Project; Technical Specification Group Services and System Aspects; Policy and charging control architecture (Release 15)," Mar. 2018, 260 pages.
3GPP TS 23.501 V15.1.0, "3rd Generation Partnership Project; Technical Specification Group Services and System Aspects; System Architecture for the 5G System; Stage 2 (Release 15)," Mar. 2018, 201 pages.
3GPP TS 23.502 V15.1.0, "3rd Generation Partnership Project; Technical Specification Group Services and System Aspects; Procedures for the 5G System; Stage 2 (Release 15)," Mar. 2018, 285 pages.
3GPP TS 29.512 V0.5.0, "3rd Generation Partnership Project; Technical Specification Group Core Network and Terminals; 5G System; Session Management Policy Control Service; Stage 3 (Release 15)," Apr. 2018, 42 pages.
3GPP TSG-RAN WG3#99bis, "Handling of Notification Control in TS 38.413," R3-182393, Nokia, Nokia Shanghai Bell, Huawei,Sanya, China, Apr. 16-20, 2018, 5 pages.
CATT, "23.501: The usage of notification control," S2-175838, SA WG2 Meeting #122bis, Aug. 21-25, 2017, Sophia Antipolis, France, 4 pages.
Oppo, et al., "Returning back to NR in case of handover for voice," SA WG2 Meeting #122bis, Oct. 23-27, 2017, Ljubljana, Slovenia, S2-176977, 6 Pages.
Huawei, "Correction on Policy Control Request Triggers," 3GPP TSG-SA2 Meeting #127, S2-184173, Sanya, China, Apr. 16-20, 2018, 8 pages.
Samsung, "Corrections on namings of SMF Service Operations," 3GPP TSG-SA WG2 Meeting #127, S2-183760, Mar. 16-20, 2018, Sanya, China, 31 pages.

* cited by examiner

COMMUNICATION METHOD AND COMMUNICATIONS APPARATUS

CROSS-REFERENCE TO RELATED APPLICATIONS

This application is a continuation of International Patent Application No. PCT/CN2019/087827, filed on May 21, 2019, which claims priority to Chinese Patent Application No. 201810491245.7, filed on May 21, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a next generation communications system, a terminal device may establish at least one packet data unit (PDU) session with a core network device using an access network device. For each PDU session, at least one quality of service (QoS) flow may be established, and a quality of service requirement for transmitting a data packet using a data radio bearer (DRB) corresponding to each QoS flow is configured for the QoS flow. If a quality of service requirement of a quality of service flow cannot be met when a data packet is transmitted using a DRB corresponding to the QoS flow, the access network device may notify the core network device of a notification control status corresponding to the QoS flow, and the notification control status is used to indicate that the quality of service requirement of the QoS flow cannot be met, such that the core network device makes a policy decision again on the QoS flow. The policy decision is, for example, deleting or modifying the QoS flow.

In some communication scenarios, for example, when a terminal device is handed over between access network devices, a PDU session that has been established in the terminal device may be handed over between the access network devices. Correspondingly, a QoS flow corresponding to the PDU session may also be handed over between the access network devices. However, because a DRB established by a source access network device before the handover may be different from a DRB established by a target access network device after the handover, when a data packet is transmitted using different DRBs corresponding to a QoS flow before and after the handover, notification control statuses of the QoS flow may also be different. Because the core network device cannot perceive the handover of the QoS flow between the access network devices, it is very likely that a notification control status that is of the QoS flow and that is recorded by the core network device is still a notification control status notified by the source access network device before the handover. Consequently, a notification control status that is of the QoS flow and that is recorded by the target access network device after the handover may be unsynchronized with the notification control status that is of the QoS flow and that is recorded by the core network device, and the core network device is prone to make a wrong policy decision on the QoS flow.

SUMMARY

This application provides a communication method and a communications apparatus, to avoid out-of-synchronization that may exist between notification control statuses of a QoS flow that are recorded on an access network side and a core network side after the QoS flow is handed over on the access network side.

According to a first aspect, a communication method is provided. In the method, in a process in which at least one QoS flow is handed over from a first access network device to a second access network device, the first access network device sends first information to the second access network device, where the first information is used to indicate that the first access network device has notified a core network device that a quality of service requirement of the at least one QoS flow cannot be met. After receiving the first information sent by the first access network device, the second access network device may send second information to the core network device, where the second information is used to notify the core network device that a quality of service requirement of a first QoS flow in the at least one QoS flow can be met, and the first QoS flow is a QoS flow that has been handed over from the first access network device to the second access network device.

Further, after receiving the information, sent by the second access network device, indicating that the quality of service requirement of the first QoS flow can be met, a session management function (SMF) network element in the core network device may notify a policy control function (PCF) network element that the quality of service requirement of the first QoS flow can be met.

In the foregoing method, in a process in which the QoS flow is handed over, the first access network device may notify the second access network device of information about a state in which the quality of service requirement of the at least one QoS flow cannot be met and that has been notified to the core network device. After the first QoS flow in the at least one QoS flow is successfully handed over to the second access network device, the second access network device may consider, by default, that the quality of service requirement of the successfully handed-over first QoS flow can be met, and then may notify the core network device that the quality of service requirement of the successfully handed-over QoS flow can be met. In this way, a notification control status that is of the QoS flow and that is perceived by a core network side can be synchronized with a notification control status that is of the QoS flow and that is recorded on an access network side after the handover, in order to prevent the core network side from making a wrong policy decision.

In a possible implementation, the first information may include an identifier of the at least one QoS flow. Alternatively, the first information may include an identifier of the at least one QoS flow and a notification control status of the at least one QoS flow. The notification control status is a first state, and the first state is used to indicate that the quality of service requirement of the at least one QoS flow cannot be met. In foregoing manner, the first access network device sends the first information to the second access network device, such that the second access network device can learn a status that is of the at least one QoS flow and that is recorded on the core network side. Subsequently, the second access network device may notify the core network side of a latest notification control status of the QoS flow after the handover, to ensure notification control statuses recorded on the core network side and the second access network device can be synchronized with each other.

In a possible implementation, the first access network device may send the first information to the second access network device through an interface connected to the second access network device.

When there is no interface connected between the first access network device and the second access network device, the first information may be forwarded using the core network side. In an implementation, the first access network device may send the first information to the second access network device using an access and mobility management function (AMF) network element. The AMF network element may transparently forward the first information.

In a possible implementation, after sending the second information to the core network device, if the second access network device detects that the quality of service requirement of the first QoS flow cannot be met, the second access network device may immediately send third information to the core network device, where the third information is used to notify the core network device that the quality of service requirement of the first QoS flow cannot be met. In comparison with other approaches in which the second access network device needs to wait a period of time before reporting the notification control status of the QoS flow again, the foregoing implementations provided in this application can enable the core network device to perceive the latest notification control status of the QoS flow in a timely manner.

In a possible implementation, after receiving the information, sent by the second access network device, indicating that the quality of service requirement of the first QoS flow can be met, and determining that a received notification control status that is of the at least one QoS flow and that is sent by the first access network device is the first state, the SMF network element may notify the PCF network element that the quality of service requirement of the first QoS flow can be met. The first state is used to indicate that the quality of service requirement of the at least one QoS flow cannot be met. In the foregoing manner, the SMF network element may selectively notify the PCF network element of a latest notification control status of a QoS flow whose notification control statuses recorded on the core network side and the access network side after the handover are inconsistent with each other, and may not notify a QoS flow whose recorded notification control statuses are consistent.

According to a second aspect, a communication method is provided. In the method, when at least one QoS flow has been handed over from a first access network device to the second access network device, the second access network device may send fourth information to a core network device, where the fourth information is used to notify the core network device that a quality of service requirement of the at least one QoS flow can be met. Further, after receiving the information, sent by the second access network device, indicating that the quality of service requirement of the at least one QoS flow can be met, an SMF network element may send fifth information to a PCF network element, where the fifth information is used to notify the PCF network element that a notification control status of the at least one QoS flow can be met. Optionally, the at least one QoS flow belongs to all QoS flows that have been successfully handed over from the first access network device to the second access network device and that require notification control.

In the foregoing method, participation of the first access network device before the handover is not required, and the second access network device directly notifies notification control statuses of all successfully handed-over QoS flows to the core network device, such that the core network device can perceive a notification control status of the handed-over QoS flow in a timely manner, and a notification control status that is of the QoS flow and that is perceived by a core network side is synchronized with a notification control status that is of the QoS flow and that is recorded on an access network side after the handover, in order to prevent the core network side from making a wrong policy decision.

In a possible implementation, after sending the fourth information to the PCF network element, if the second access network device detects that the quality of service requirement of the at least one QoS flow cannot be met, the second access network device may immediately notify the core network device that the quality of service requirement of the at least one QoS flow cannot be met. In comparison with other approaches in which the second access network device needs to wait a period of time before reporting the notification control status of the QoS flow again, the foregoing implementations provided in this application can enable the core network device to perceive a latest notification control status of the QoS flow in a timely manner.

In a possible implementation, after receiving the fourth information sent by the second access network device, and determining that a received notification control status that is of the at least one QoS flow and that is sent by the first access network device is a first state, the SMF network element may send the fifth information to the PCF network element. The first state is used to indicate that the quality of service requirement of the at least one QoS flow cannot be met. In the foregoing manner, the SMF network element may selectively notify the PCF network element of a latest notification control status of a QoS flow whose notification control statuses recorded on the core network side and the access network side after the handover, and may not notify a QoS flow whose recorded notification control statuses are consistent.

According to a third aspect, a communication method is provided. In the method, an SMF network element determines a received notification control status that is of at least one QoS flow and that is sent by a first access network device, and when a second QoS flow in the at least one QoS flow has been handed over from a first access network device to a second access network device, the SMF network element determines a third QoS flow whose notification control status is a first state in the second QoS flow. Further, the SMF network element updates the notification control status of the third QoS flow to a second state, and sends sixth information to a PCF network element, where the sixth information is used to notify the PCF network element that the notification control status of the third QoS flow is the second state. The first state is used to indicate that a quality of service requirement of the at least one QoS flow cannot be met, and the second state is used to indicate that the quality of service requirement of the at least one QoS flow can be met.

In the foregoing method, the QoS flow is handed over generally because a quality of service requirement of the QoS flow in a source access network device cannot be met, and the QoS flow needs to be handed over to a target access network device in which the quality of service requirement can be met. Based on this, after determining the successfully handed-over QoS flow, the SMF network element may consider, by default, that a quality of service requirement of the QoS flow cannot be met as previous recorded, but now can be met, and then notify the PCF network element, such that the PCF network element can perceive a status of the successfully handed-over QoS flow in a timely manner, and avoid making a wrong decision.

In a possible implementation, before determining the third QoS flow whose notification control status is the first state in the second QoS flow, the SMF network element may further receive seventh information sent by an AMF network element, where the seventh information includes an identifier of the second QoS flow that has been handed over from the first access network device to the second access network device, such that the SMF network element can learn the QoS flow that has been successfully handed over.

According to a fourth aspect, a communication method is provided. In the method, an SMF network element may determine that at least one QoS flow is handed over from a first access network device to a second access network device, and then the SMF network element may send eighth information to a PCF network element, where the eighth information is used to indicate that the at least one QoS flow is handed over from the first access network device to the second access network device. After receiving the eighth information sent by the SMF network element, the PCF network element may determine a QoS flow whose notification control status is a first state in the at least one QoS flow, and update the notification control status of the determined QoS flow to a second state. The first state is used to indicate that a quality of service requirement of the determined QoS flow cannot be met, and the second state is used to indicate that the quality of service requirement of the determined QoS flow can be met.

In an implementation, a handover indication trigger may be configured for the PCF network element. After receiving third information that is sent by the SMF network element and that indicates that the at least one QoS flow has been successfully handed over, the PCF network element may be triggered to perform an operation of updating the notification control status of the QoS flow.

In the foregoing method, the SMF network element may notify the PCF network element that the at least one QoS flow has been successfully handed over, such that the PCF network element can perceive a handover of the QoS flow in a timely manner, and then update a notification control status of the successfully handed-over QoS flow in a timely manner, to ensure as much as possible that the notification control status is synchronized with a notification control status that is of the QoS flow and that is recorded by an access network side after the handover, and avoid making a wrong decision.

According to a fifth aspect, this application provides a first type of communications apparatus. The communications apparatus has a function of implementing the first access network device in the first aspect. For example, the communications apparatus includes a corresponding module, unit, or means for performing the steps in the first aspect by the first access network device. The function, the module, the unit, or the means may be implemented by software, or may be implemented by hardware, or may be implemented by hardware executing corresponding software.

In a possible design, the communications apparatus may include a processing module and a transceiver module. The processing module and the transceiver module may perform a corresponding function of the first access network device in the method provided in any one of the first aspect or the possible implementations of the first aspect.

In another possible design, the communications apparatus may include a processor, and may further include a transceiver. The transceiver is configured to receive and send a signal, and the processor executes a program instruction to complete the method performed by the first access network device in any one of the first aspect or the possible implementations of the first aspect.

The communications apparatus may further include one or more memories. The memory is configured to be coupled to the processor, and the memory stores a computer program instruction and/or data required for implementing the function of the first access network device in the first aspect. The processor may execute the computer program instruction stored in the memory to complete the method performed by the first access network device in any one of the first aspect or the possible implementations of the first aspect.

According to a sixth aspect, this application provides a second type of communications apparatus. The communications apparatus has a function of implementing the second access network device in the first aspect or the second aspect. For example, the communications apparatus includes a corresponding module, unit, or means for performing the steps in the first aspect or the second aspect by the second access network device. The function, the module, the unit, or the means may be implemented by software, or may be implemented by hardware, or may be implemented by hardware executing corresponding software.

In a possible design, the communications apparatus may include a processing module and a transceiver module. The processing module and the transceiver module may perform a corresponding function of the second access network device in the method provided in any one of the first aspect or the possible implementations of the first aspect, or the processing module and the transceiver module may perform a corresponding function of the second access network device in the method provided in any one of the second aspect or the possible implementations of the second aspect.

In another possible design, the communications apparatus may include a processor, and may further include a transceiver. The transceiver is configured to receive and send a signal, and the processor executes a program instruction to complete the method performed by the second access network device in any one of the first aspect or the possible implementations of the first aspect, or to complete the method performed by the second access network device in any one of the second aspect or the possible implementations of the second aspect.

The communications apparatus may further include one or more memories. The memory is configured to be coupled to the processor, and the memory stores a computer program instruction and/or data required for implementing the function of the second access network device in the first aspect or the second aspect. The processor may execute the computer program instruction stored in the memory to complete the method performed by the first access network device in any one of the first aspect or the possible implementations of the first aspect, or to complete the method performed by the second access network device in any one of the second aspect or the possible implementations of the second aspect.

According to a seventh aspect, this application provides a third type of communications apparatus. The communications apparatus has a function of implementing the SMF network element in any one of the first aspect to the fourth aspect. For example, the communications apparatus includes a corresponding module, unit, or means for performing the steps in any one of the first aspect to the fourth aspect by the SMF network element. The function, the module, the unit, or the means may be implemented by software, or may be implemented by hardware, or may be implemented by hardware executing corresponding software.

In a possible design, the communications apparatus may include a processing module and a transceiver module. The processing module and the transceiver module may perform a corresponding function of the SMF network element in the method provided in any one of the first aspect to the fourth aspect or any possible implementation of the aspect.

In another possible design, the communications apparatus may include a processor, and may further include a transceiver. The transceiver is configured to receive and send a signal, and the processor executes a program instruction to complete the method performed by the SMF network element in any one of the first aspect to the fourth aspect or any possible implementation of the aspect.

The communications apparatus may further include one or more memories. The memory is configured to be coupled to the processor, and the memory stores a computer program instruction and/or data required for implementing the function of the SMF network element in any one of the first aspect to the fourth aspect. The processor may execute the computer program instruction stored in the memory to complete the method performed by the SMF network element in any one of the first aspect to the fourth aspect or any possible implementation of the aspect.

According to an eighth aspect, this application provides a fourth type of communications apparatus. The communications apparatus has a function of implementing the PCF network element in the fourth aspect. For example, the communications apparatus includes a corresponding module, unit, or means for performing the steps in the fourth aspect by the PCF network element. The function, the module, the unit, or the means may be implemented by software, or may be implemented by hardware, or may be implemented by hardware executing corresponding software.

In a possible design, the communications apparatus may include a processing module and a transceiver module. The processing module and the transceiver module may perform a corresponding function of the PCF network element in the method provided in any one of the fourth aspect or the possible implementations of the fourth aspect.

In another possible design, the communications apparatus may include a processor, and may further include a transceiver. The transceiver is configured to receive and send a signal, and the processor executes a program instruction to complete the method performed by the PCF network element in any one of the fourth aspect or the possible implementations of the fourth aspect.

The communications apparatus may further include one or more memories. The memory is configured to be coupled to the processor, and the memory stores a computer program instruction and/or data required for implementing the function of the PCF network element in the fourth aspect. The processor may execute the computer program instruction stored in the memory to complete the method performed by the PCF network element in any one of the fourth aspect or the possible implementations of the fourth aspect.

According to a ninth aspect, this application provides a communications system. The communications system includes the first type of communications apparatus in the fifth aspect, the second type of communications apparatus in the sixth aspect, the third type of communications apparatus in the seventh aspect, and the fourth type of communications apparatus in the eighth aspect.

According to a tenth aspect, this application provides a chip. The chip may be connected to a memory, and is configured to read and execute a software program stored in the memory, to implement the methods in the foregoing aspects.

According to an eleventh aspect, this application provides a computer storage medium. The computer storage medium stores a computer-readable instruction, and when a computer reads and executes the computer-readable instruction, the computer is enabled to perform the methods in the foregoing aspects.

According to a twelfth aspect, this application further provides a computer program product including a software program. When the computer program product runs on a computer, the computer is enabled to perform the methods in the foregoing aspects.

DESCRIPTION OF EMBODIMENTS

To make the objectives, technical solutions, and advantages of this application clearer, the following further describes this application in detail with reference to the accompanying drawings.

First, a communications system to which the technical solutions provided in this application are applicable is described.

Figure 1:
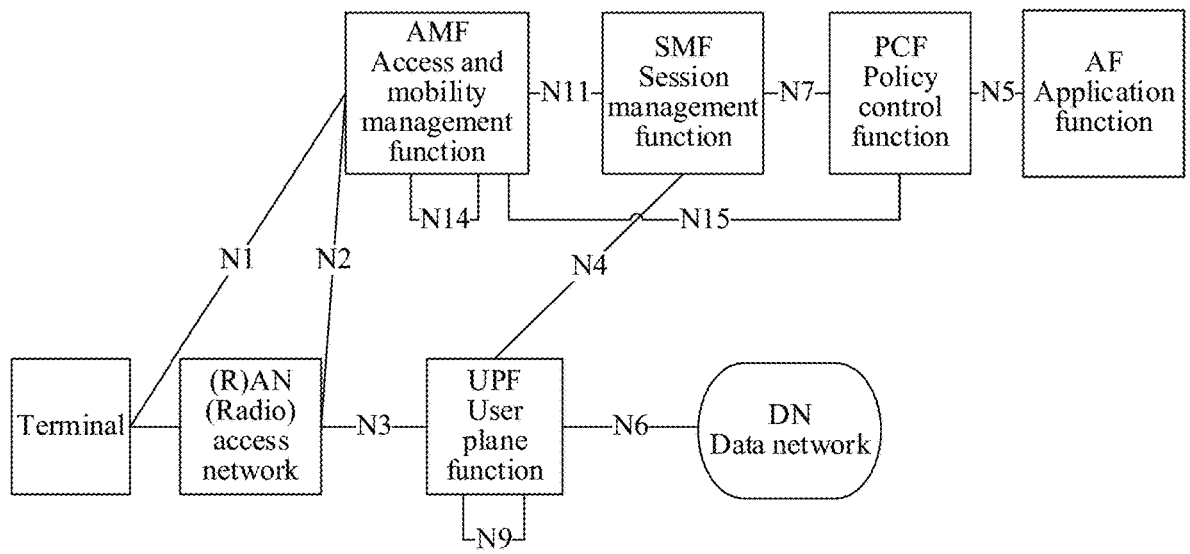
FIG. 1 is a network architectural diagram of a $5^{th}$ generation (5G) communications system according to this application.
Figure 2:
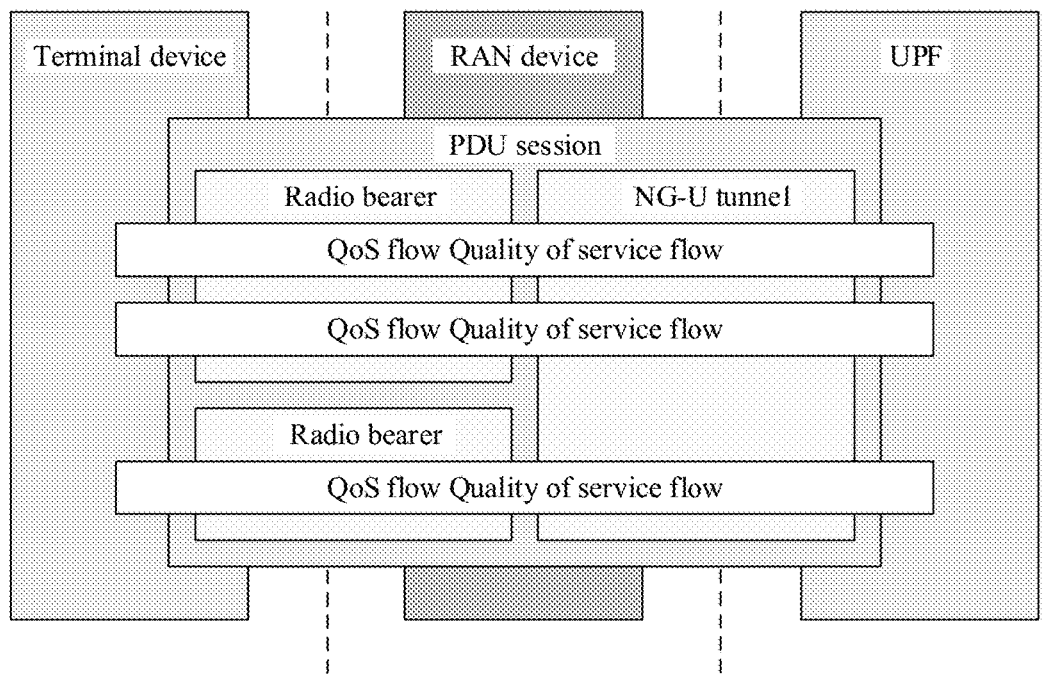
FIG. 2 shows a QoS model based on a QoS flow according to this application.

The technical solutions provided in this application are applicable to various communications systems, for example, a Long-Term Evolution (LTE) system, a 5th generation (5G) communications system, and another similar communications system. Illustratively, FIG. 1 is a network architectural diagram of a 5G communications system.

A terminal device may include a handheld device, a vehicle-mounted device, a wearable device, or a computing device with a wireless communication function, or another processing device connected to a wireless modem, and a user equipment (UE), a mobile station (MS), terminal equipment, and the like that are in various forms.

A (radio) access network ((R)AN) device may be configured to implement functions such as a radio physical layer function, radio resource management, radio access control, and mobility management. The RAN device may include a base station, for example, an access node or access point (AP), a next generation NodeB (gNB), a next generation evolved NodeB (gNB), a transmission reception point (TRP), a transmission point (TP), or another access node in a 5G system. It should be understood that, in the following description, the (R)AN devices are collectively referred to as RAN devices for ease of description.

A user plane function (UPF) network element, as a function network element of a user plane, may be connected to an external data network. Main functions of the user plane function network element include functions related to the user plane, such as data packet routing and transmission, packet detection, service usage reporting, QoS processing, lawful interception, uplink packet detection, and downlink data packet storage.

Main functions of an AMF network element include functions related to access and mobility, such as connection management, mobility management, registration management, access authentication and authorization, reachability management, and security context management.

Main functions of an SMF network element include functions related to a session, such as session management (for example, session establishment, modification, and release, including tunnel maintenance between the UPF and a RAN), selection and control of the UPF, service and session continuity (SSC) mode selection, and roaming.

Main functions of a PCF network element include functions related to a policy, such as formulating a unified policy, providing policy control, and obtaining subscription information related to a policy decision.

An application function (AF) network element may be a third-party application control platform, or may be a device deployed by an operator. Main functions of the application function network element include providing application related information, and serving a plurality of application servers.

A main function of a data network (DN) is providing a specific data service, such as an operator service, Internet access, or a third-party service.

The foregoing content mainly describes the network elements or devices that may be mentioned in this application. It should be understood that the network architecture shown in FIG. 1 is merely used as an example for description, and does not constitute a limitation on a network architecture of a communications system to which this application is applicable. The communications system to which this application is applicable may further include other network elements or devices, which are not listed one by one in this application. In addition, a connection form between network elements or devices in the communications system to which this application is applicable may be a reference point-based form shown in FIG. 1, or may be a service-oriented interface-based form. In addition, the communications system to which this application is applicable may be further classified into a non-roaming scenario and a roaming scenario. The roaming scenario may be further classified into a local breakout scenario and a home routing scenario. Network architectures of the communications system in these communication scenarios may be different, but all of the network architectures may be applicable to the embodiments of this application.

Figure 3:
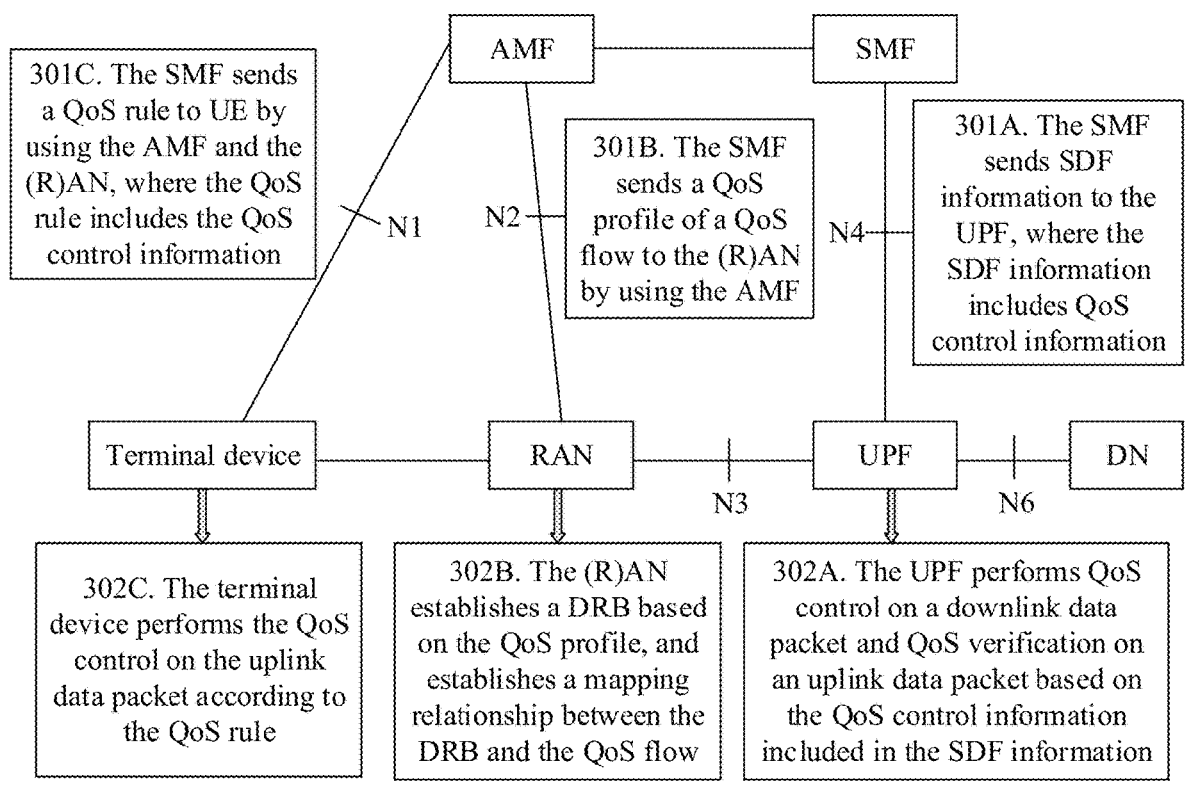
FIG. 3 is a schematic flowchart of establishing a QoS flow according to this application.

Currently, in the 5G communications system, to ensure end-to-end service quality, a QoS model based on a QoS flow is proposed. Referring to FIC 2, a terminal device may establish at least one PDU session with a UPF on a core network side using a RAN device. For each PDU session, at least one QoS flow is established between the terminal device, the RAN device, and the UPF network element. FIG. 3 is a schematic flowchart of establishing a QoS flow. A procedure of interaction between network elements or devices includes the following steps.

Step 301: An SMF network element instructs, according to a local policy, or a policy and charging control (PCC) rule sent by a PCF network element, a terminal device, an RAN device, and a UPF network element to establish a QoS flow. An establishment process is divided into three stages: Step 301A: The SMF network element sends service data flow (SDF) information to the UPF network element, where the service data flow information includes QoS control information. Step 301B: The SMF network element sends a QoS profile of the QoS flow to the (R)AN device using an AMF network element. Step 301C: The SMF network element sends a QoS rule to the terminal device using the AMF network element and/or the (R)AN device, where the QoS rule includes QoS control information. It should be noted that content included in the QoS profile and content included in the QoS control information are basically the same, and both are generated by the SMF according to the local policy or the PCC rule.

Step 302: Establish the QoS flow between the terminal device, the RAN device, and the UPF network element. The (R)AN device may establish a DRB for an air interface based on the QoS profile, and store a binding relationship between the QoS flow and the DBR. During data packet transmission between the terminal device, the RAN device, and the UPF network element, in a downlink direction, when receiving a downlink data packet, the UPF network element performs QoS control based on the SDF information sent by the SMF network element, and adds, to a packet header of the downlink data packet, a QoS flow identifier (QFI) used to identify the QoS flow. When receiving the downlink data packet, the RAN device determines, by parsing the QFI in the packet header, a QoS flow that can be used, and transmits the downlink data packet over a corresponding DRB based on the stored binding relationship between the QoS flow and the DRB. In an uplink direction, when the terminal device needs to send an uplink data packet, the terminal device may determine a QoS flow according to a QoS rule, add a QFI to a packet header of the uplink data packet, and then transmits the uplink data packet over a corresponding DRB based on the binding relationship between the QoS flow and the DBR. When receiving the uplink data packet, the RAN device adds, based on the QFI in the packet header, the QFI to the packet header of the uplink data packet forwarded to the UPF network element. When receiving the uplink data packet sent by the RAN device, the UPF network element verifies whether the uplink data packet is transmitted using a correct QoS flow.

Because the QoS profiles generated by the SMF are different, the established QoS flow may include two types.

A type 1 is a guaranteed bit rate (GBR) QoS flow. In this case, the QoS profile may include a 5G QoS identifier (5QI) used to identify QoS attribute information, an allocation and retention priority (ARP), a guaranteed flow bit rate (GFBR), and a maximum bit rate (MBR). Optionally, the QoS profile may further include notification control information. When the QoS profile includes the notification control information, the GBR QoS flow is a GBR QoS flow that requires notification control. When the QoS profile does not include the notification control information, the GBR QoS flow is a GBR QoS flow that does not require notification control.

During data packet transmission on a DRB corresponding to a GBR QoS flow, if the RAN device detects that a quality of service requirement of the GBR QoS flow cannot be met, and it is configured that the GBR QoS flow requires notification control, the RAN device may notify, using the AMF network element, the SMF network element that the quality of service requirement of the GBR QoS flow cannot be met, such that the SMF network element modifies or deletes the GBR QoS flow according to the local policy, or the SMF network element instructs the PCF network element to modify or delete the GBR QoS flow. In an example, when a bit rate for transmitting a data packet does not reach an expected bit rate specified by the GFBR, it may be considered that the quality of service requirement of the GBR QoS flow cannot be met. In another example, when a transmission delay (or a packet loss rate, or the like) during data packet transmission does not meet a transmission delay (or a packet loss rate, or the like) included in the 5QI, it may also be considered that the quality of service requirement of the GBR QoS flow cannot be met.

A type 2 is a non-guaranteed bit rate (non-GBR) QoS flow. In this case, the QoS profile may include a 5QI, an ARP, and the like.

For a QoS flow that requires notification control, when a handover between RAN devices occurs, a notification control status recorded on a RAN side may be unsynchronized with a notification control status recorded on a core network side, and the core network side is prone to make a wrong policy decision on the QoS flow.

For example, in a scenario in which the terminal device is handed over between RAN devices, a PDU session that has been established in the terminal device may be handed over between the RAN devices. Correspondingly, a QoS flow corresponding to the PDU session may also be handed over between the RAN devices. A DRB established by a source RAN device before the handover may be different from a DRB established by a target RAN device after the handover. Therefore, before the handover, a quality of service requirement cannot be met when a data packet is transmitted using the DRB established by the source RAN device corresponding to the QoS flow. However, after the handover, it is very likely that the quality of service requirement can be met when a data packet is transmitted using the DRB established by the target RAN device corresponding to the QoS flow.

In this case, because the SMF network element and the PCF network element cannot perceive the handover of the QoS flow between the RAN devices, it is very likely that a notification control status that is of the QoS flow and that is recorded by the SMF network element and the PCF network element are still a state in which the quality of service requirement cannot be met and that is notified by the source RAN device before the handover. Therefore, when making a policy decision again on the QoS flow whose quality of service requirement cannot be met as notified by the source RAN device, the SMF network element or the PCF network element may make a wrong policy decision. For example, although a quality of service requirement of the QoS flow in the target RAN device after the handover can be met, the QoS flow is deleted, the quality of service requirement of the QoS flow is reduced, or the like.

To resolve the foregoing problem, embodiments of this application provide a communication method and a communications apparatus. In a scenario in which a QoS flow is handed over between RAN devices, a notification control status of the QoS flow after the handover is fed back to a core network side in a timely manner, such that notification control statuses that are of the QoS flow and that are maintained on the core network side and the RAN device after the handover may keep synchronized as much as possible.

It should be understood that, in the embodiments of this application, a scenario in which the QoS flow is handed over between the RAN devices is not limited to a scenario in which a terminal device is handed over between the RAN devices, and there may be another possible scenario in which the QoS flow is handed over between the RAN devices. For example, when the terminal device returns from a radio resource control (RRC) inactive mode to an RRC connected mode, a handover of the QoS flow between the RAN devices may also occur. For another example, in a dual connectivity scenario in which the terminal device establishes a PDU session with a master RAN device and a secondary RAN device, the QoS flow may also be handed over from the master RAN device to the secondary RAN device, or handed over from the secondary RAN device to the master RAN device. These scenarios are also applicable to the embodiments of this application.

The following describes in detail the communication method provided in this application with reference to embodiments. It should be understood that terms "first", "second", and the like below are only used for distinguishing description, and shall not be understood as indicating or implying relative importance or indicating or implying an order. For example, for ease of differentiation in the following description, a source RAN corresponding to a QoS flow before a handover is referred to as a first RAN device, and a target RAN device corresponding to the QoS flow after the handover is referred to as a second RAN device.

Embodiment 1

Figure 4:
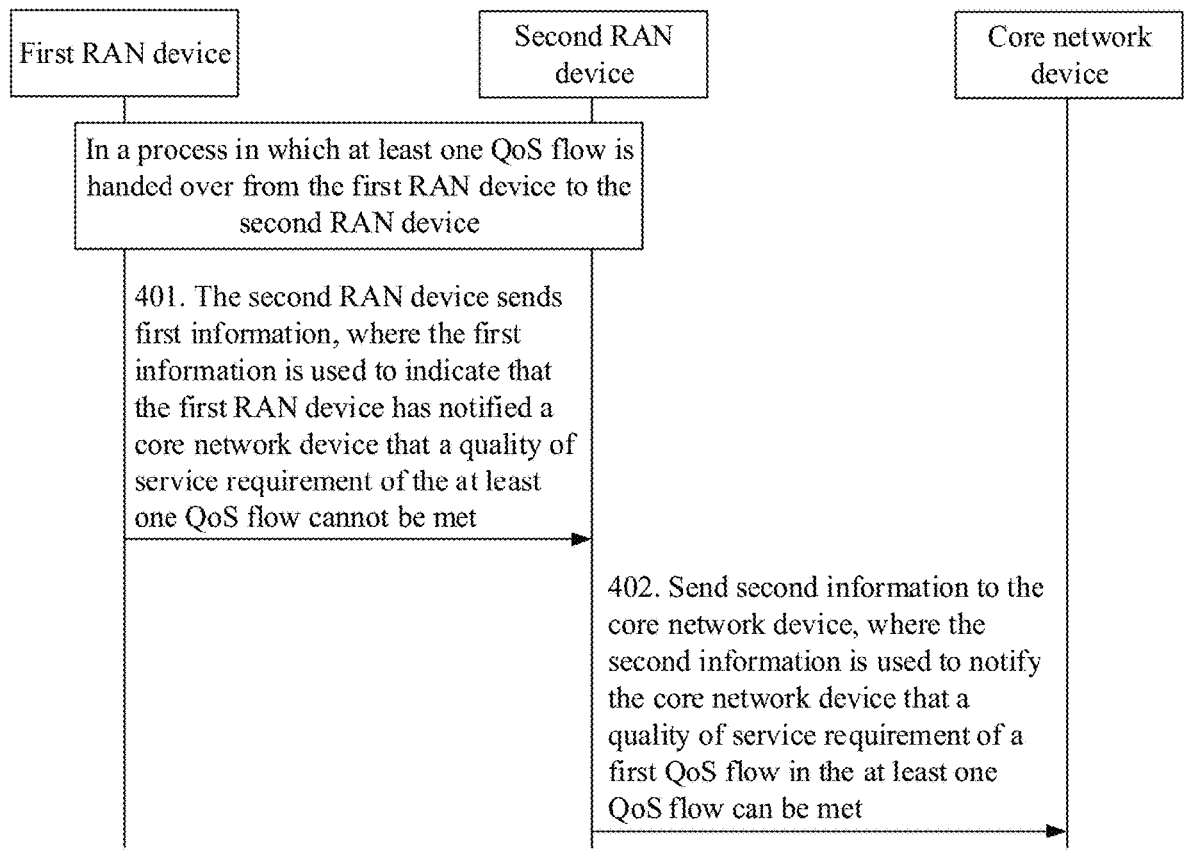
FIG. 4 is a schematic flowchart of a communication method according to Embodiment 1 of this application.

FIG. 4 is a schematic flowchart of a communication method according to Embodiment 1 of this application. The method includes the following steps.

Step 401: In a process in which at least one QoS flow is handed over from a first RAN device to a second RAN device, the first RAN device sends first information to the second RAN device, where the first information is used to indicate that the first RAN device has notified a core network device that a quality of service requirement of the at least one QoS flow cannot be met.

In Embodiment 1 of this application, that the first RAN device has notified the core network device that the quality of service requirement of the at least one QoS flow cannot be met may be understood as follows: A notification control status that is of the at least one QoS flow and that is latest notified by the first RAN device to the core network device is a state in which the quality of service requirement cannot be met. For ease of description in the following, the notification control status includes a first state and a second state. The first state is used to indicate that a quality of service requirement of a QoS flow cannot be met, and the second state is used to indicate that the quality of service requirement of the QoS flow can be met. The at least one QoS flow is a QoS flow that requires notification control. It should be understood that, in this application, the QoS flow that requires notification control is not limited to a GBR QoS flow, or may be any other QoS flow that needs to be notified to the core network device when a quality of service requirement is not met.

When the first RAN device notifies the second RAN device that the first RAN device has notified the core network device that the quality of service requirement of the at least one QoS flow cannot be met, the first RAN device may add, to the first information sent to the second RAN device, an identifier that is of the at least one QoS flow and that is latest notified by the first RAN device to the core network device, and the identifier of the QoS flow is, for example, a QFI. Alternatively, the first RAN device may add an identifier of the at least one QoS flow and a notification control status of the at least one QoS flow to the first information sent to the second RAN device, and the notification control status is a first state.

Before the handover occurs, the first RAN device may detect whether a quality of service requirement of an established QoS flow is met. When the at least one QoS flow cannot be met and the at least one QoS flow is a QoS flow that requires notification control, the first RAN device may notify the core network device that the notification control status of the at least one QoS flow is the first state. Then when the at least one QoS flow can be met, the first RAN device may further notify the core network device that the at least one QoS flow is in the second state. Based on this, the first RAN device may locally record the notification control status that is of the QoS flow and that is notified to the core network device. For example, the first RAN device may record a sending status table of quality of service notification control (QNC).

In an example of this application, the identifier of the QoS flow and the notification control status that corresponds to the QoS flow and that is latest notified to the core network device may be recorded in the sending status table of the QNC. The identifier of the QoS flow is, for example, a QFI, and the notification control status includes the first state and the second state. Table 1 shows an example of a sending status table of QNC.

TABLE 1

| QFI | Notification control status |
| --- | --- |
| QoS flow #1 | 1 |
| QoS flow #2 | 0 |
| ... | ... |
| QoS flow #n | 1 |

As shown in Table 1, QoS flows recorded by the first RAN device are identified by #1 to #n. When a corresponding notification control status is "1", it represents the first state, that is, the quality of service requirement of the QoS flow cannot be met. When a corresponding notification control status is "0", it represents the second state, that is, the quality of service requirement of the QoS flow can be met. Each time when notifying the notification control status of the QoS flow to the core network device, the first RAN device may correspondingly update the locally recorded sending status table of the QNC. For example, for a QoS flow #1, a notification control status currently recorded in Table 1 is "1". If the first RAN device subsequently detects that a quality of service requirement of the QoS flow #1 can be met, the first RAN device may notify the core network device that the quality of service requirement of the QoS flow #1 can be met, and may correspondingly update the locally recorded notification control status of the QoS flow #1 to "0".

When detecting that the at least one QoS flow needs to be handed over from the first RAN device to the second RAN device, the first RAN device may notify content of a recorded latest sending status table of the QNC to the second RAN device, or may alternatively notify, to the second RAN device, content of the QoS flow whose notification control status is "1" in the recorded latest sending status table of the QNC.

In another example of this application, only an identifier of at least one QoS flow whose notification control status latest notified to the core network device is the first state may be recorded in the sending status table of the QNC. In other words, an identifier of the at least one QoS flow whose quality of service requirement latest notified to the core network device cannot be met is recorded. Table 2 shows an example of a sending status table of QNC.

TABLE 2

| QFI |
| --- |
| QoS flow #1 |
| QoS flow #2 |
| ... |
| QoS flow #n |

As shown in Table 2, the at least one QoS flow recorded by the first RAN device is identified by #1 to #n. Each time when notifying the notification control status of the QoS flow to the core network device, the first RAN device may update the recorded sending status table of the QNC. For example, for a QoS flow #1, the QoS flow #1 is currently recorded in Table 2, indicating that a quality of service requirement of the QoS flow #1 cannot be met. If the first RAN device subsequently detects that the quality of service requirement of the QoS flow #1 can be met, the first RAN device may notify the core network device that the quality of service requirement of the QoS flow #1 can be met, and may correspondingly delete the QoS flow #1 recorded in Table 2. Similarly, if the first RAN device subsequently detects that a quality of service requirement of another QoS flow different from the QoS flow recorded in Table 2 cannot be met, and notifies the other QoS flow to the core network device, the first RAN device may also add an identifier of the other QoS flow to Table 2.

When detecting that the at least one QoS flow needs to be handed over from the first RAN device to the second RAN device, the first RAN device may notify content of a recorded latest sending status table of the QNC to the second RAN device.

Certainly, the foregoing examples are only used for description. A form in which the first RAN device sends the first information to the second RAN device in this embodiment of this application is not limited thereto.

Step 402: After receiving the first information sent by the first RAN device, the second RAN device sends second information to the core network device, where the second information is used to notify the core network device that a quality of service requirement of a first QoS flow in the at least one QoS flow can be met, where the first QoS flows belongs to all QoS flows that have been successfully handed over from the first RAN device to the second RAN device and that require notification control.

In this embodiment of this application, in a process in which the at least one QoS flow is handed over from the first RAN device to the second RAN device, it is likely that not all the QoS flows can be successfully handed over. For the second RAN device, some QoS flows whose quality of service requirements still cannot be met may be directly deleted. Therefore, the second RAN device may first determine, from the at least one QoS flow, a QoS flow that has been successfully handed over from the first RAN device to the second RAN device, namely, the first QoS flow, and then may consider by default that a quality of service requirement of the successfully handed-over first QoS flow can be met.

The following lists two scenarios to describe a procedure of interaction between the first RAN device and the second RAN device in Embodiment 1 of this application.

Scenario 1: A directly connected Xn interface exists between the first RAN device and the second RAN device. In this case, the handover procedure may be a handover based on the Xn interface.

Figure 5:
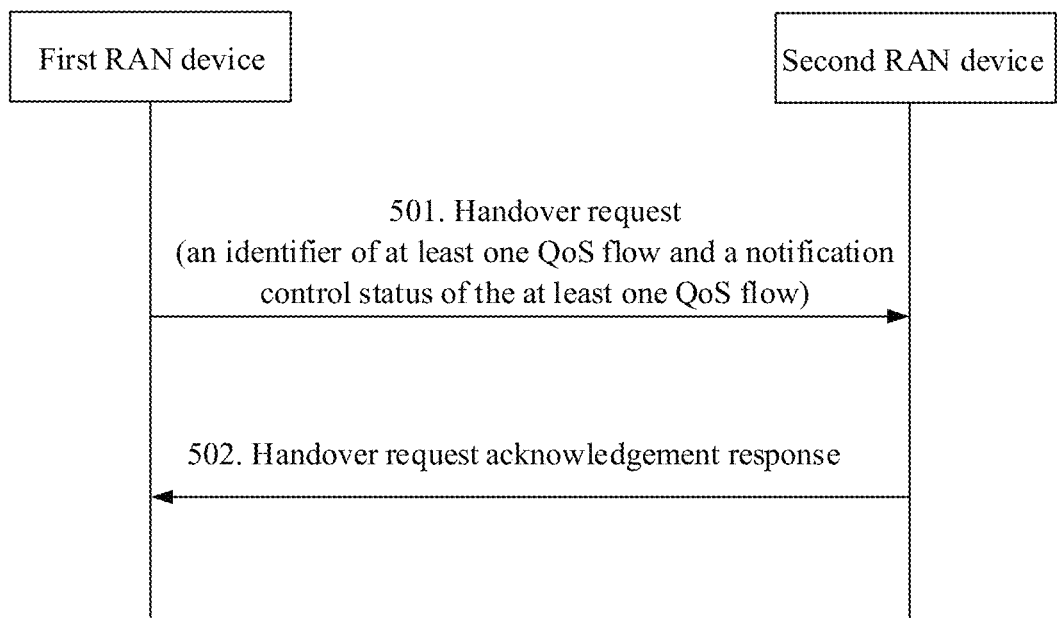
FIG. 5 is a schematic diagram of a procedure of interaction between a first radio access network (RAN) device and a second RAN device in Scenario 1 according to Embodiment 1 of this application.

FIG. 5 shows the procedure of interaction between the first RAN device and the second RAN device in Scenario 1 provided in Embodiment 1 of this application.

Step 501: The first RAN device directly sends a handover request to the second RAN device, where the handover request carries an identifier that is of the at least one QoS flow and that is latest notified by the first RAN device to a core network device, and a notification control status of the at least one QoS flow, and the notification control status is a first state, indicating that a quality of service requirement of the QoS flow cannot be met.

Step 502: The second RAN device sends a handover request acknowledgement response to the first RAN device.

Scenario 2: A directly connected Xn interface does not exist between the first RAN device and the second RAN device. A core network device participates in the handover procedure. For example, the handover procedure may be a handover based on an N2 interface.

Figure 6:
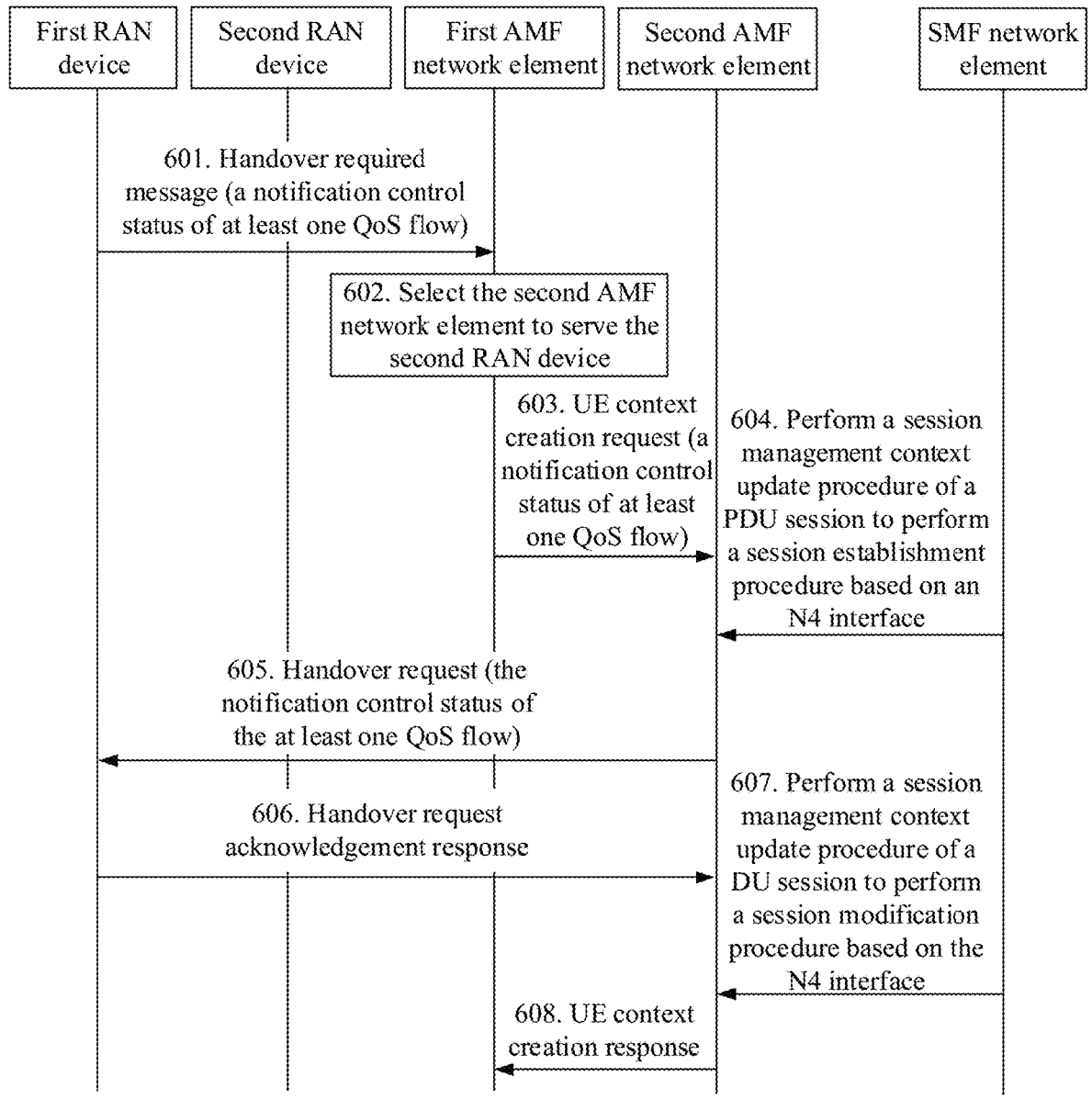
FIG. 6 is a schematic diagram of a procedure of interaction between a first RAN device and a second RAN device in Scenario 2 according to Embodiment 1 of this application.

FIG. 6 shows the procedure of interaction between the first RAN device and the second RAN device in Scenario 2 provided in Embodiment 1 of this application.

Step 601: The first RAN device sends a handover required message to a first AMF network element serving the first RAN device, where the handover required message carries an identifier that is of the at least one QoS flow and that is latest notified by the first RAN device to a core network device, and a notification control status of the at least one QoS flow, and the notification control status is a first state, indicating that a quality of service requirement of the QoS flow cannot be met.

In an example of this application, the identifier of the at least one QoS flow and the notification control status of the at least one QoS flow may be included in a source to target transparent container, and the container includes content sent by the first RAN device to the second RAN device using a core network. The AMF network element only performs forwarding but does not perceive the content in the container.

Step 602: The first AMF network element selects a second AMF network element to serve the second RAN device.

Step 603: The first AMF network element sends a UE context creation request (namf_communication_createUEcontext request) to the second AMF network element, where the UE context creation request carries the identifier of the at least one QoS flow and the notification control status of the at least one QoS flow.

Step 604: The second AMF network element and an SMF network element perform a session management context update procedure of a PDU session, to perform a session establishment procedure based on an N4 interface.

Step 605: The second AMF network element sends a handover request to the second RAN device, where the handover request carries the identifier that is of the at least one QoS flow and that is latest notified by the first RAN device to the core network device, and the notification control status of the at least one QoS flow.

Step 606: The second RAN device sends a handover request acknowledgement response to the second AMF network element.

Step 607: The second AMF network element and the SMF network element perform a session management context update procedure of a PDU session, to perform a session modification procedure based on the N4 interface.

Step 608: The second AMF network element sends a UE context creation response (namf_communication_createUEcontext response) to the first AMF network element.

In Scenario 1 and Scenario 2, after the second RAN device determines that the first RAN device has notified the core network device that the quality of service requirement of the at least one QoS flow cannot be met, when the second RAN device detects that the first QoS flow in the at least one QoS flow is successfully handed over from the first RAN device to the second RAN device, to enable the core network device to learn a latest notification control status of the successfully handed-over first QoS flow in a timely manner, in this embodiment of this application, the second RAN device may directly notify the core network device that the quality of service requirement of the successfully handed-over first QoS flow can be met.

In the foregoing procedure, the first RAN device or the second RAN device may notify the notification control status of the QoS flow to the core network device in the following two implementations.

In a first implementation, the first RAN device or the second RAN device may notify the notification control status of the QoS flow to the SMF network element using the AMF network element. When learning the notification control status of the QoS flow, the SMF network element may perform a session management policy modification procedure according to a local policy, to modify or delete the QoS flow.

In a second implementation, the first RAN device or the second RAN device may notify the notification control status of the QoS flow to the SMF network element using the AMF network element. The SMF network element may further notify the notification control status of the QoS flow to a PCF network element, such that the SMF network element and the PCF network element perform a session management policy modification procedure according to a dynamic PCC rule, to modify or delete the QoS flow.

In the second implementation, after receiving information, namely, second information, indicating that the quality of service requirement of the first QoS flow in the at least one QoS flow and that is sent by the second RAN device can be met, the SMF network element may notify the PCF network element that the quality of service requirement of the first QoS flow can be met.

In addition, after the second RAN device notifies the core network device that the quality of service requirement of the first QoS flow in the at least one QoS flow can be met, in an implementation, if the second RAN device subsequently detects that the quality of service requirement of the first QoS flow cannot be met, the second RAN device may immediately send third information to the core network device, where the third information is used to notify the core network device that the quality of service requirement of the first QoS flow cannot be met. In comparison with other approaches in which the notification control status of the QoS flow can be notified again only after a preset time length, the foregoing implementations proposed in this application can reduce a delay, such that the core network device can perceive a latest notification control status of the QoS flow on a core network side in a timely manner.

In a manner provided in Embodiment 1, in a process in which the at least one QoS flow is handed over from the first RAN device to the second RAN device, the notification control status of the at least one QoS flow may also be transferred from the first RAN device to the second RAN device at the same time, such that the second RAN device can accurately learn the notification control status that is of the at least one QoS flow and that has been notified by the first RAN device to the core network device. This is equivalent to learning the notification control status that is of the QoS flow and that is currently recorded by the core network device. In this case, the second RAN device notifies the notification control status of the handed-over QoS flow to the core network device, such that the notification control status that is of the QoS flow and that is perceived on the core network side can be synchronized with the notification control status that is of the handed-over QoS flow and that is recorded on an access network side, and the core network device can avoid making a wrong policy decision.

Embodiment 2

Figure 7:
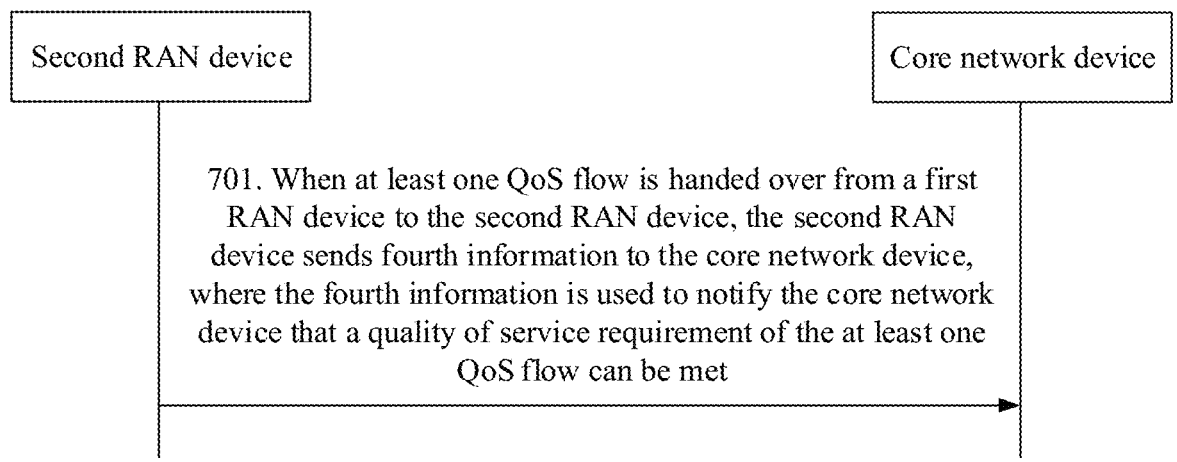
FIG. 7 is a schematic flowchart of a communication method according to Embodiment 2 of this application.

FIG. 7 is a schematic flowchart of a communication method according to Embodiment 2 of this application. The method includes the following step.

Step 701: When at least one QoS flow is handed over from a first RAN device to a second RAN device, the second RAN device sends fourth information to a core network device, where the fourth information is used to notify the core network device that a quality of service requirement of the at least one QoS flow can be met.

In Embodiment 2 of this application, the at least one QoS flow may be understood as all QoS flows that have been successfully handed over from the first RAN device to the second RAN device and that require notification control.

The second RAN device may send the fourth information to an AMF network element, and then the AMF network element forwards the fourth information to an SMF network element, in order to notify the SMF network element that the quality of service requirement of the at least one QoS flow can be met. Further, after receiving the fourth information sent by the second RAN device, the SMF network element may further send fifth information to a PCF network element, where the fifth information is used to notify the PCF network element that the quality of service requirement of the at least one QoS flow can be met.

During implementation, after receiving the fourth information, the SMF network element may update a recorded notification control status of the at least one QoS flow. The notification control status includes a first state and a second state. The first state is used to indicate that a quality of service requirement of the at least one QoS flow cannot be met, and the second state is used to indicate that the quality of service requirement of the at least one QoS flow can be met. The SMF network element may further determine, depending on a specific situation, whether to notify the updated notification control status of the at least one QoS flow to the PCF network element.

In an example of this application, after receiving the information, namely, the fourth information, indicating that the notification control status that is of the at least one QoS flow and that is notified by the second RAN device is the second state, the SMF network element may determine whether the SMF network element receives, from the first RAN device, information indicating that the notification control status of the at least one QoS flow is the first state. If a determining result is no, it indicates that before the handover, a core network side does not receive a notification that the quality of service requirement of the at least one QoS flow cannot be met. In this case, the SMF network element may not need to repeatedly notify the PCF network element that the notification control status of the at least one QoS flow is the second state. If the determining result is yes, it may indicate that before the handover, the core network side has received a notification indicating that the quality of service requirement of the at least one QoS flow cannot be met. To ensure that notification control statuses that are of the QoS flow and that are recorded by the core network side and the second RAN device after the handover can be synchronized with each other, after determining that a latest received notification control status that is of the at least one QoS flow and that is notified by the first RAN device is a first state, the SMF network element may send the fifth information to the PCF network element, to notify the PCF network element that the notification control status of the at least one QoS flow is the second state.

Figure 8:
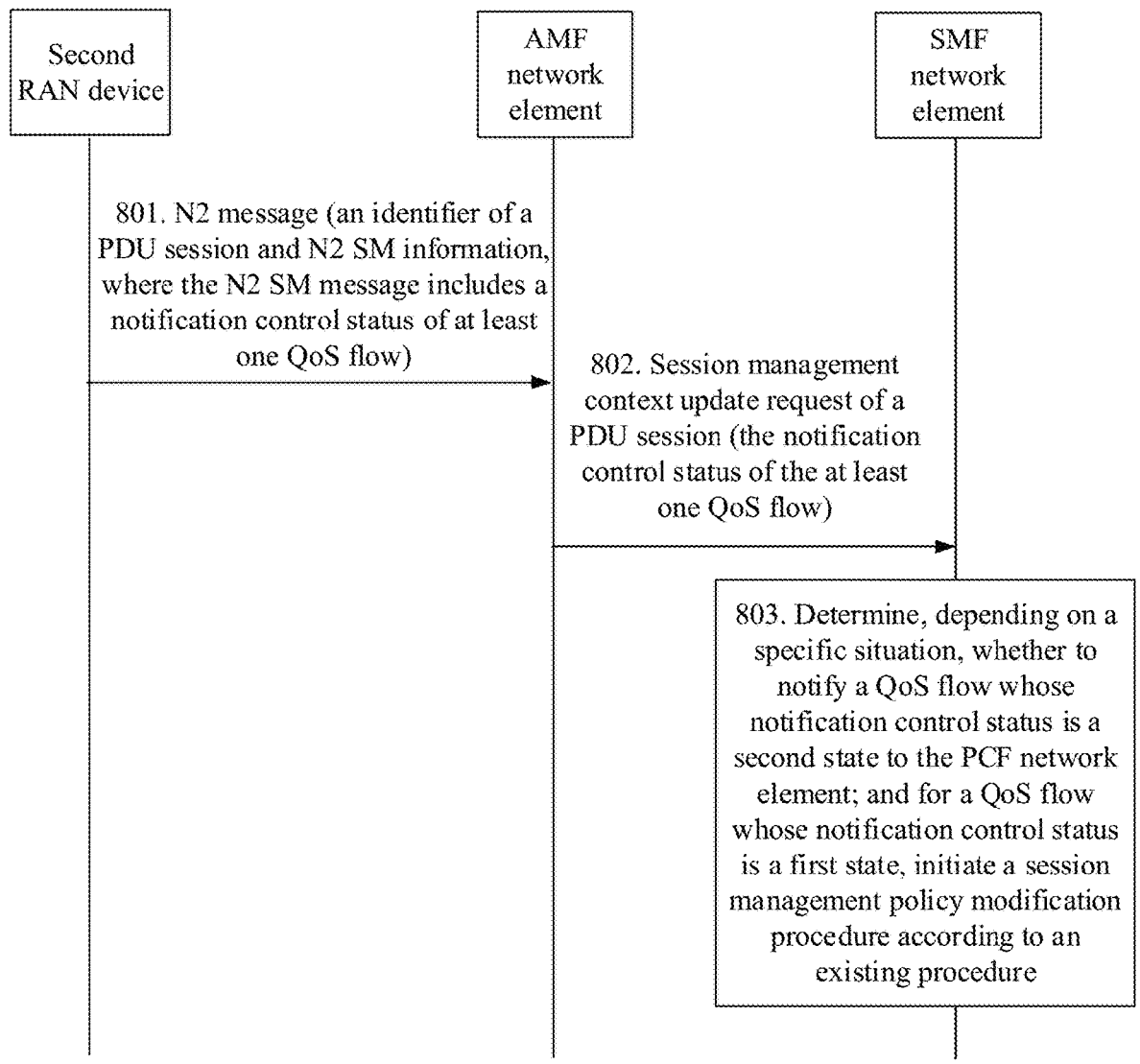
FIG. 8 is a schematic flowchart in which a second RAN device notifies a core network device of a notification control status of at least one QoS flow according to Embodiment 2 of this application.

The following describes, with reference to a scenario, a process in which the second RAN device notifies the notification control status of the at least one QoS flow to the core network device in Embodiment 2 of this application, as shown in FIG. 8.

It is assumed that a PDU session that is established using the first RAN device and that is between the terminal device and a first UPF session that serves the first RAN device has been switched to a PDU session that is established using the second RAN device and that is between the terminal device and a second UPF network element that serves the second RAN device. In addition, the at least one QoS flow is also handed over from an end-to-end path including the terminal device, the first RAN device, and the first UPF to an end-to-end path including the terminal device, the second RAN device, and the second UPF.

Step 801: The second RAN device sends an N2 message to an AMF network element, where the N2 message includes an identifier of a PDU session and N2 session management (SM) information. The N2 SM message includes a QFI of the at least one QoS flow and a notification control status of the at least one QoS flow, namely, a second state.

Optionally, the N2 SM message may further include a QFI of another QoS flow whose quality of service requirement cannot be met and that requires notification control, and a notification control status of the other QoS flow, and the notification control status of the other QoS flow is a first state.

Step 802: The AMF network element sends a session management context update request (nsmf_PDUsession_updateSMcontext request) of a PDU session to the SMF network element, where the request may include the QFI of the at least one QoS flow and the notification control status of the at least one QoS flow, and the notification control status of the at least one QoS flow is the second state. Optionally, the request may further include the QFI of the other QoS flow and the notification control status of the other QoS flow, and the notification control status of the other QoS flow is the first state.

Step 803: After receiving the request, the SMF network element determines, depending on a specific situation, whether to notify the PCF network element of a QoS flow whose notification control status is the second state and that is reported by the second RAN device. For this process, refer to the description in Example 1. For a QoS flow whose notification control status is the first state and that is reported by the second RAN device, the SMF network element may initiate a session management policy modification procedure according to an existing procedure, to delete or modify the QoS flow.

In Embodiment 2, the second RAN device may send, to the core network device, the notification control status of the at least one QoS flow that is successfully handed over from the first RAN device and that requires notification control, such that the core network device can accurately perceive the notification control status of the handed-over QoS flow in a timely manner, in order to prevent the core network device from making a wrong policy decision.

Embodiment 3

Figure 9:
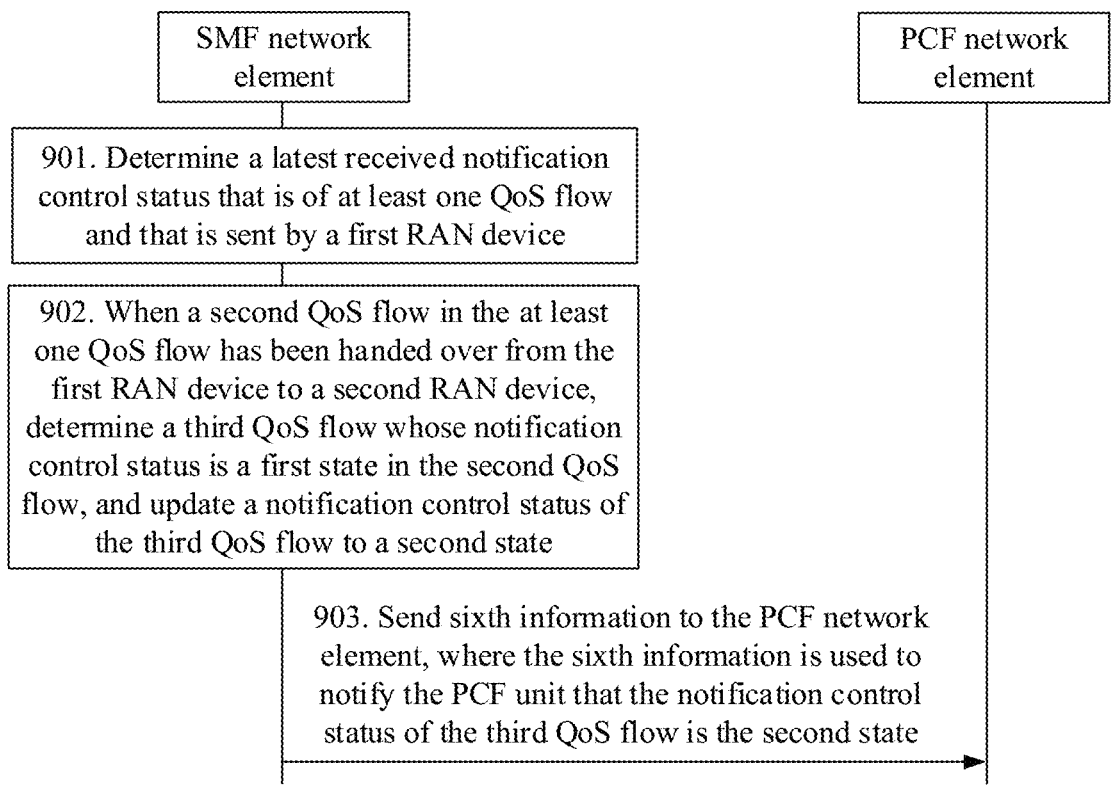
FIG. 9 is a schematic flowchart of a communication method according to Embodiment 3 of this application.

FIG. 9 is a schematic flowchart of a communication method according to Embodiment 3 of this application. The method includes the following steps.

Step 901: An SMF network element determines a received notification control status that is of at least one QoS flow and that is sent by a first RAN device.

In Embodiment 3 of this application, the at least one QoS flow may be understood as a corresponding QoS flow that requires notification control in a PDU session of a terminal device before a handover. The notification control status includes a first state and a second state. The first state is used to indicate that a quality of service requirement of a QoS flow cannot be met, and the second state is used to indicate that the quality of service requirement of the QoS flow can be met.

Step 902: When a second QoS flow in the at least one QoS flow has been handed over from the first RAN device to a second RAN device, the SMF network element determines a third QoS flow whose notification control status is the first state in the second QoS flow, and updates a notification control status of the third QoS flow to the second state.

Step 903: The SMF network element sends sixth information to a PCF unit, where the sixth information is used to notify the PCF network element that the notification control status of the third QoS flow is the second state.

In an example of this application, the SMF network element may receive seventh information sent by an AMF network element. The seventh information may include an identifier of the second QoS flow that has been successfully handed over from the first RAN device to the second RAN device, and may further include an identifier of a PDU session that has been successfully handed over from the first RAN device to the second RAN device, such that the SMF network element determines information about the successfully handed-over PDU session and second QoS flow.

If the handover of the PDU session and the QoS flow between the first RAN device and the second RAN device is based on an Xn interface, the first RAN device or the second RAN device may notify the successfully handed-over PDU session and second QoS flow to the AMF network element, and then the AMF network element notifies the successfully handed-over PDU session and second QoS flow to the SMF network element. If the handover of the PDU session and the QoS flow between the first RAN device and the second RAN device is based on an N2 interface, the AMF network element may perceive the successfully handed-over PDU session and second QoS flow during the handover, and then may directly notify the successfully handed-over PDU session and second QoS flow to the SMF network element.

For the successfully handed-over second QoS flow in the at least one QoS flow, the SMF network element may first determine whether a notification control status of the second QoS flow in the notification control status that is of the at least one QoS flow and that is latest received from the first RAN device is the first state. For the third QoS flow whose notification control status is the first state in the second QoS flow, the SMF network element may consider by default that the quality of service requirement of the third QoS flow can be met, and may notify the PCF network element that the quality of service requirement of the third QoS flow can be met. For a fourth QoS flow whose notification control status is the second state in the second QoS flow, because a quality of service requirement that is of the fourth QoS flow and that is recorded on a core network side has been met, the SMF network element may not need to repeatedly notify the notification control status of the fourth QoS flow to the PCF network element.

If there is no QoS flow that has been successfully handed over from the first RAN device to the second RAN device in the at least one QoS flow, the SMF network element may notify the PCF network element according to an existing procedure, such that the PCF network element makes a policy decision again on the QoS flow.

For example, the SMF network element may notify a notification control status of a related QoS flow to the PCF network element when initiating a session management (SM) policy association modification procedure. A policy control request trigger is configured for the PCF network element. The PCF network element may identify a notification sent by the SMF network element, and the notification includes information indicating that the quality of service requirement of the third QoS flow can be met. Then the PCF network element may make a policy decision based on the notification sent by the SMF network element, and send a policy decision result to the SMF network element.

In Embodiment 3, the QoS flow is handed over between the first RAN device and the second RAN device generally because a quality of service requirement of the QoS flow in the first RAN device cannot be met, and the QoS flow needs to be handed over to the second RAN device in which the quality of service requirement can be met. Based on this, after determining the successfully handed-over QoS flow, the SMF network element may consider, by default, that a quality of service requirement of the QoS flow cannot be met as previous recorded, but now can be met, and then notify the PCF network element, such that the PCF network element can perceive a status of the successfully handed-over QoS flow in a timely manner, and avoid making a wrong decision.

Embodiment 4

Figure 10:
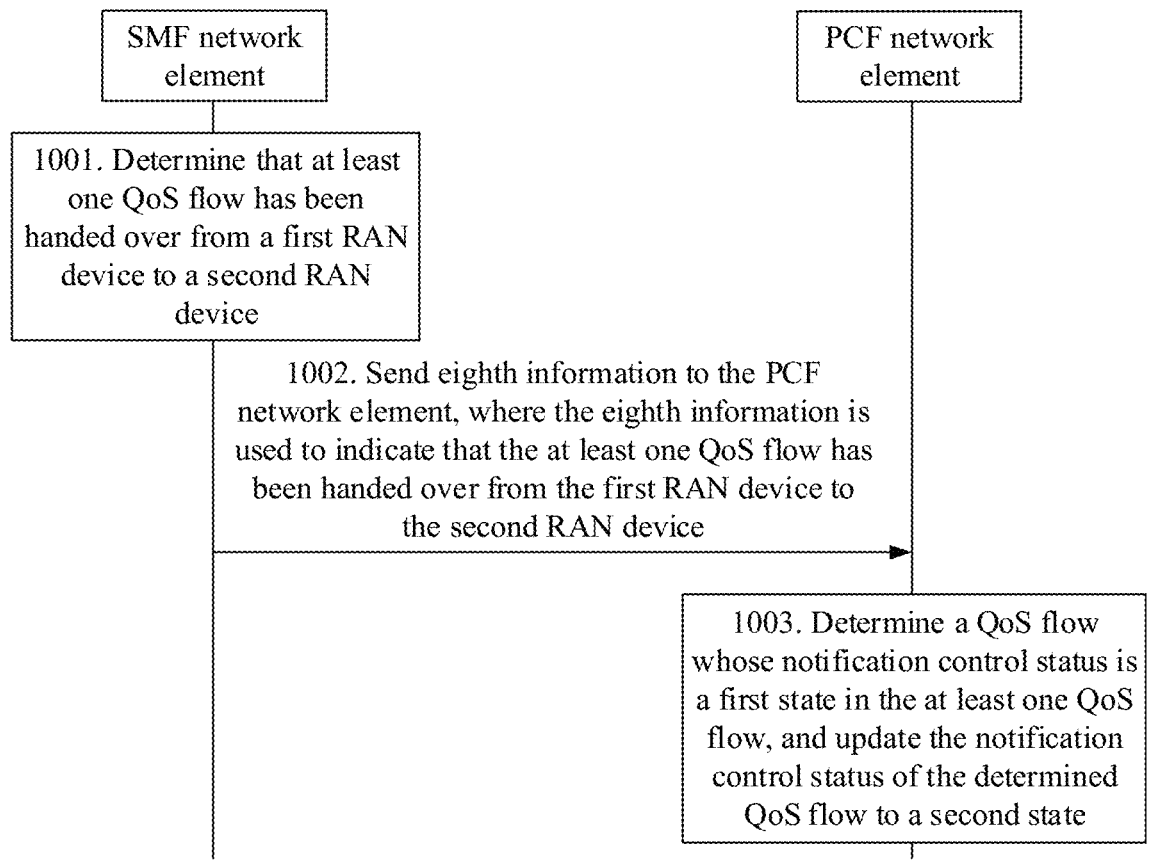
FIG. 10 is a schematic flowchart of a communication method according to Embodiment 4 of this application.

FIG. 10 is a schematic flowchart of a communication method according to Embodiment 4 of this application. The method includes the following steps.

Step 1001: An SMF network element determines that at least one QoS flow has been handed over from a first RAN device to a second RAN device.

In Embodiment 4 of this application, the at least one QoS flow may be understood as a QoS flow that has been successfully handed over from the first RAN device to the second RAN device. For example, with a notification of an AMF network element, the SMF network element may determine that the at least one QoS flow is successfully handed over. For details, refer to the related description in Embodiment 3.

Step 1002: The SMF network element sends eighth information to a PCF network element, where the eighth information is used to indicate that the at least one QoS flow has been handed over from the first RAN device to the second RAN device.

A difference from Embodiment 3 lies in that, in Embodiment 4 of this application, the SMF network element may notify, in a procedure of initiating session management policy association modification (SM policy association modification), the PCF network element that the at least one QoS flow has been successfully handed over. Further, the PCF network element updates a recorded notification control status of the at least one QoS flow. The notification control status includes a first state and a second state. The first state is used to indicate that a quality of service requirement of a QoS flow cannot be met, and the second state is used to indicate that the quality of service requirement of the QoS flow can be met.

Step 1003: After receiving the eighth information, the PCF network element determines a QoS flow whose notification control status is the first state in the at least one QoS flow, and updates the notification control status of the determined QoS flow to the second state.

In an implementation, a handover indication trigger may be configured for the PCF network element. After receiving the eighth information that is sent by the SMF network element and that indicates that the at least one QoS flow has been successfully handed over, the PCF network element may be triggered to perform an operation of updating the notification control status of the QoS flow. Then, the PCF network element may make a policy decision based on a latest updated notification control status of the QoS flow, and send a policy decision result to the SMF network element.

In Embodiment 4, after determining that the at least one QoS flow is successfully handed over, the SMF network element may notify the PCF network element that the at least one QoS flow is successfully handed over, and then the PCF network element updates the notification control status of the at least one QoS flow, such that the PCF network element can perceive a status of the successfully handed-over QoS flow in a timely manner, and avoid making a wrong decision as much as possible.

Based on a same technical concept, the following describes, with reference to the accompanying drawings, a communications apparatus provided in the embodiments of this application.

An embodiment of this application provides a communications apparatus, and the communications apparatus has a function of implementing the first RAN device in the foregoing method Embodiment 1. For example, the communications apparatus includes a corresponding module, unit, or means for performing the steps in the foregoing method Embodiment 1 by the first RAN device. The function, the module, the unit, or the means may be implemented by software, or may be implemented by hardware, or may be implemented by hardware executing corresponding software.

Figure 11:
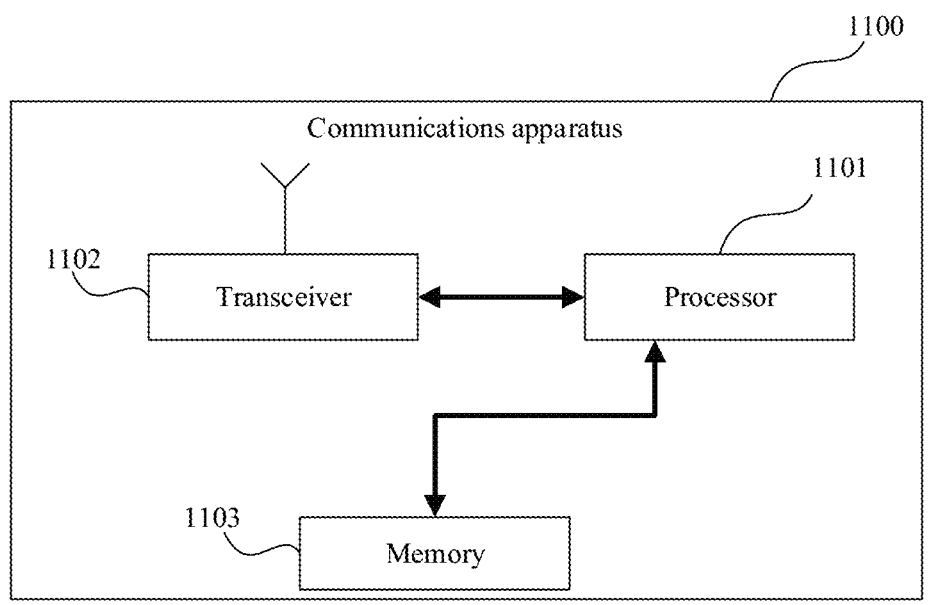
FIG. 11 to FIG. 18 are schematic structural diagrams of communications apparatuses according to embodiments of this application.

FIG. 11 is a schematic structural diagram of a communications apparatus 1100 according to an embodiment of this application. The apparatus 1100 includes a processor 1101 and a transceiver 1102. The processor 1101 is configured to support a first RAN device in performing the function in the foregoing method Embodiment 1. The transceiver 1102 is configured to support the first RAN device in performing a function of receiving and sending a message. The apparatus 1100 may further include a memory 1103. The processor 1101, the transceiver 1102, and the memory 1103 are connected to each other. The memory 1103 is configured to store a computer program instruction required for implementing the function of the first RAN device in the foregoing method Embodiment 1. The processor 1101 is configured to execute the computer program instruction stored in the memory 1103, to control the transceiver 1102 to receive and send a signal, and complete a step of performing a corresponding function by the first RAN device in the foregoing method Embodiment 1.

For example, the processor 1101 is configured to send, in a process in which at least one quality of service flow is handed over from the communications apparatus 1100 to a second access network device, first information to the second access network device using the transceiver 1102, where the first information is used to indicate that the communications apparatus 1100 has notified a core network device that a quality of service requirement of the at least one quality of service flow cannot be met.

In a possible implementation, the first information may include an identifier of the at least one quality of service flow and a notification control status of the at least one quality of service flow. The notification control status is a first state, and the first state is used to indicate that the quality of service requirement of the at least one quality of service flow cannot be met.

In a possible implementation, the processor 1101 is configured to: send, using the transceiver 1102, the first information to the second access network device over an interface connected to the second access network device; or send the first information to the second access network device using the transceiver 1102 and an AMF network element.

For steps performed by the processor 1101 and the transceiver 1102, refer to related descriptions in the steps performed by the first RAN device in the foregoing method Embodiment 1. Details are not described herein.

Figure 12:
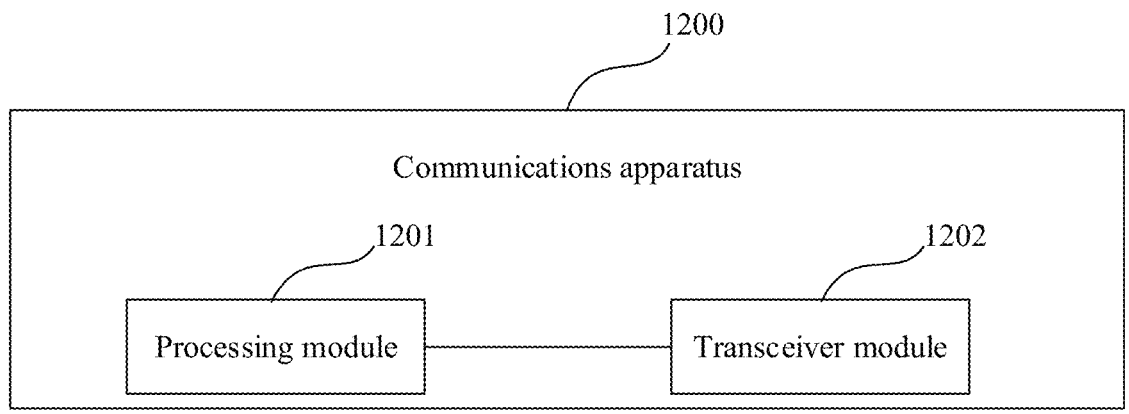

Alternatively, the communications apparatus 1100 may be implemented using logical units. FIG. 12 is a schematic structural diagram of a communications apparatus 1200 according to an embodiment of this application. The apparatus 1200 includes a processing module 1201 and a transceiver module 1202. The processing module 1201 corresponds to the processor 1101 in the foregoing communications apparatus 1100, and the transceiver module 1202 corresponds to the transceiver 1102 in the foregoing communications apparatus 1100. The processing module 1201 and the transceiver module 1202 may be respectively configured to implement corresponding functions of the first RAN device in the foregoing method Embodiment 1. For an implementation process, refer to related descriptions in the foregoing method Embodiment 1 and the communications apparatus 1100. Details are not described herein.

An embodiment of this application provides another communications apparatus, and the communications apparatus has a function of implementing the second RAN device in the foregoing method Embodiment 1 or 2. For example, the communications apparatus includes a corresponding module, unit, or means for performing the steps in the foregoing method Embodiment 1 or 2 by the second RAN device. The function, the module, the unit, or the means may be implemented by software, or may be implemented by hardware, or may be implemented by hardware executing corresponding software.

Figure 13:
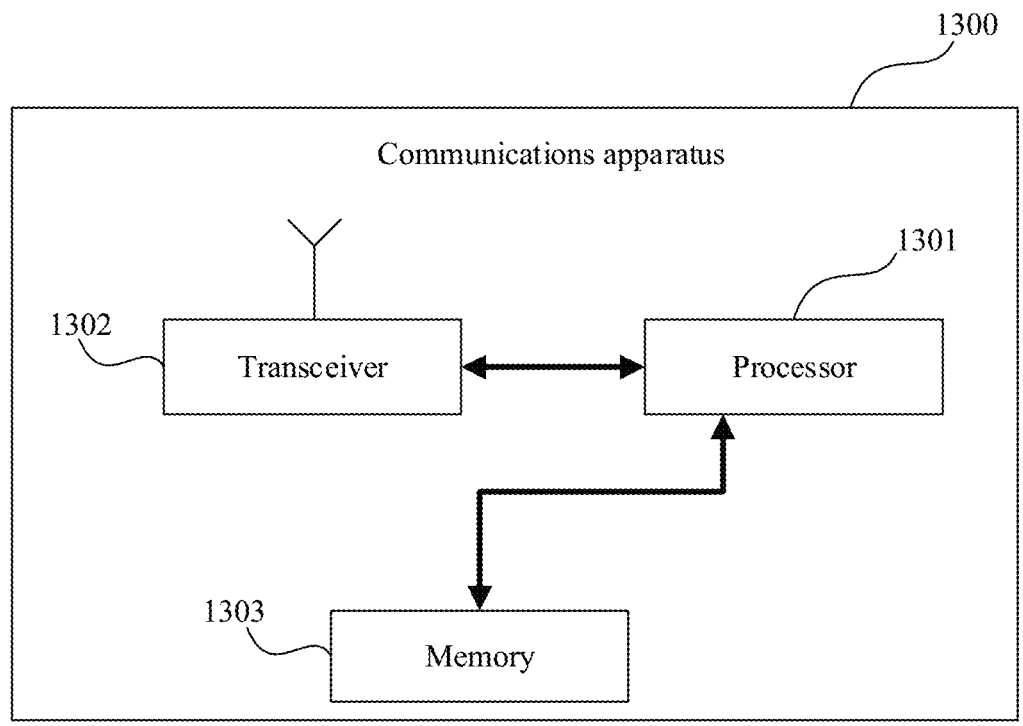

FIG. 13 is a schematic structural diagram of a communications apparatus 1300 according to an embodiment of this application. The apparatus 1300 includes a processor 1301 and a transceiver 1302. The processor 1301 is configured to support a second RAN device in performing the function in the foregoing method Embodiment 1 or 2. The transceiver 1302 is configured to support the second RAN device in performing a function of receiving and sending a message. The apparatus 1300 may further include a memory 1303. The processor 1301, the transceiver 1302, and the memory 1303 are connected to each other. The memory 1303 is configured to store a computer program instruction required for implementing the function of the second RAN device in the foregoing method Embodiment 1 or 2. The processor 1301 is configured to execute the computer program instruction stored in the memory 1303, to control the transceiver 1302 to receive and send a signal, and complete a step of performing a corresponding function by the second RAN device in the foregoing method Embodiment 1 or 2.

In a possible design, the processor 1301 is configured to receive, using the transceiver 1302, first information sent by the first access network device, where the first information is used to indicate that the first access network device has notified a core network device that a quality of service requirement of at least one quality of service flow cannot be met. The processor 1301 is further configured to send second information to the core network device using the transceiver 1302, where the second information is used to notify the core network device that a quality of service requirement of a first quality of service flow in the at least one quality of service flow can be met, where the first quality of service flow is a quality of service flow that has been handed over from the first access network device to the communications apparatus 1300.

The processor 1301 is further configured to: when detecting that the quality of service requirement of the first quality of service flow cannot be met, send third information to the core network device using the transceiver 1302, where the third information is used to notify the core network device that the quality of service requirement of the first quality of service flow cannot be met.

In another possible design, when the at least one quality of service flow has been handed over from the first access network device to the communications apparatus 1300, the processor 1301 is configured to send fourth information to the core network device using the transceiver 1302, where the fourth information is used to notify the core network device that the quality of service requirement of the at least one quality of service flow can be met. Optionally, the at least one quality of service flow belongs to all quality of service flows that have been handed over from the first access network device to the communications apparatus 1300 and that require notification control.

For steps performed by the processor 1301 and the transceiver 1302, refer to related descriptions in the steps performed by the second RAN device in the foregoing method Embodiment 1 or 2. Details are not described herein.

Figure 14:
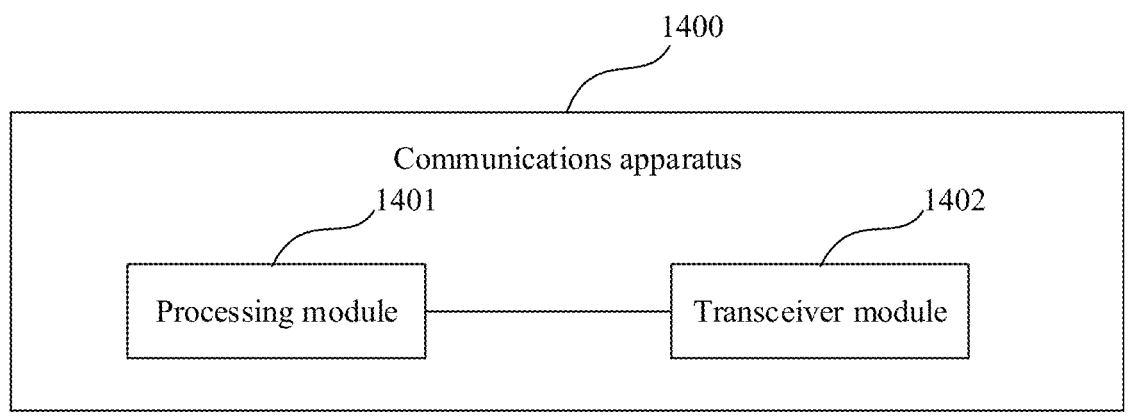

Alternatively, the communications apparatus 1300 may be implemented using logical units. FIG. 14 is a schematic structural diagram of a communications apparatus 1400 according to an embodiment of this application. The apparatus 1400 includes a processing module 1401 and a transceiver module 1402. The processing module 1401 corresponds to the processor 1301 in the foregoing communications apparatus 1300, and the transceiver module 1402 corresponds to the transceiver 1302 in the foregoing communications apparatus 1300. The processing module 1401 and the transceiver module 1402 may be respectively configured to implement corresponding functions of the second RAN device in the foregoing method Embodiment 1 or method Embodiment 2. For an implementation process, refer to related descriptions in the foregoing method Embodiment 1 or method Embodiment 2 and the communications apparatus 1300. Details are not described herein.

An embodiment of this application provides another communications apparatus, and the communications apparatus has a function of implementing the SMF network element in any one of the foregoing method Embodiment 1 to method Embodiment 4. For example, the communications apparatus includes a corresponding module, unit, or means for performing the steps in any one of the foregoing method Embodiment 1 to method Embodiment 4 by the SMF network element. The function, the module, the unit, or the means may be implemented by software, or may be implemented by hardware, or may be implemented by hardware executing corresponding software.

Figure 15:
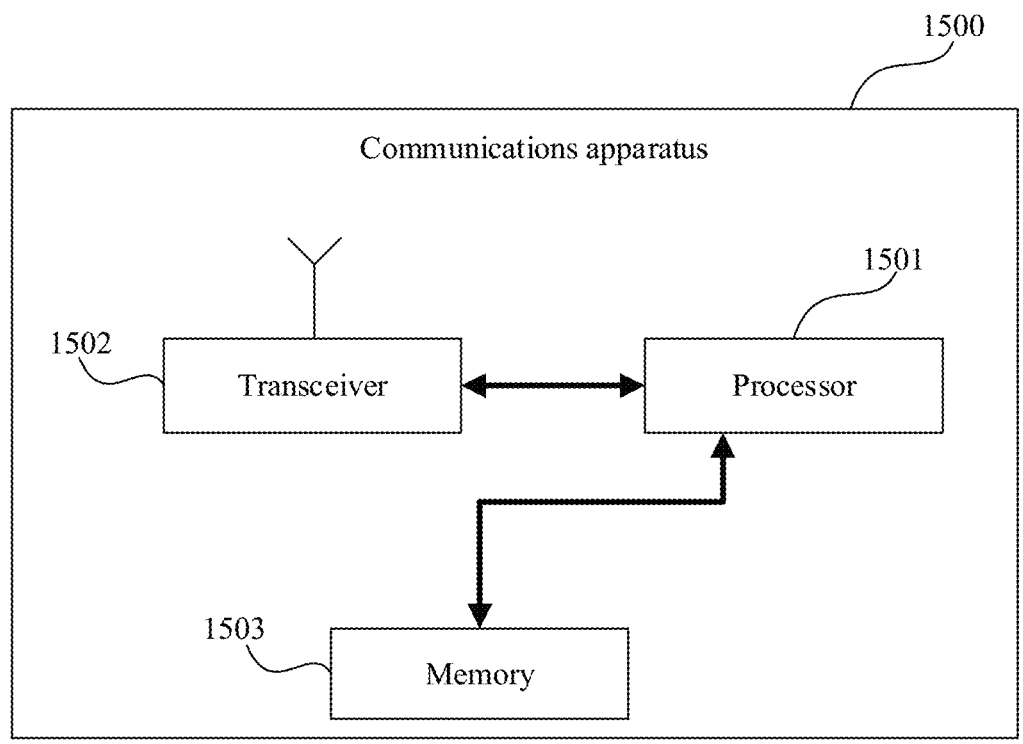

FIG. 15 is a schematic structural diagram of a communications apparatus 1500 according to an embodiment of this application. The apparatus 1500 includes a processor 1501 and a transceiver 1502. The processor 1501 is configured to support an SMF network element in performing the function in any one of the foregoing method Embodiment 1 to method Embodiment 4. The transceiver 1502 is configured to support the SMF network element in performing a function of receiving and sending a message. The apparatus 1500 may further include a memory 1503. The processor 1501, the transceiver 1502, and the memory 1503 are connected to each other. The memory 1503 is configured to store a computer program instruction required for implementing the function of the SMF network element in any one of the foregoing method Embodiment 1 to method Embodiment 4. The processor 1501 is configured to execute the computer program instruction stored in the memory 1503, to control the transceiver 1502 to receive and send a signal, and complete a step of performing a corresponding function by the SMF network element in any one of the foregoing method Embodiment 1 to method Embodiment 4.

In a first possible design, the processor 1501 may be configured to receive, using the transceiver 1502, a notification control status that is of at least one quality of service flow and that is sent by the second access network device. The at least one quality of service flow is a quality of service flow that has been handed over from a first access network device to the second access network device. The notification control status is a second state, and the second state is used to indicate that a quality of service requirement of the at least one quality of service flow can be met. The processor 1501 is further configured to send fifth information to a PCF network element using the transceiver 1502, where the fifth information is used to notify the PCF network element that the quality of service requirement of the at least one quality of service flow can be met.

Optionally, the processor 1501 is further configured to: before sending the fifth information to the PCF network element using the transceiver 1502, determine that a received notification control status that is of the at least one quality of service flow and that is sent by the first access network device is a first state, where the first state is used to indicate that the quality of service requirement of the at least one quality of service flow cannot be met.

In a second possible design, the processor 1501 may be configured to determine a received notification control status that is of at least one quality of service flow and that is sent by a first access network device. Further, the processor 1501 may be further configured to: when a second quality of service flow in the at least one quality of service flow has been handed over from the first access network device to a second access network device, determine a third quality of service flow whose notification control status is a first state in the second quality of service flow. Further, the processor 1501 is further configured to: update the notification control status of the third quality of service flow to a second state, and send sixth information to a PCF network element using the transceiver 1502, where the sixth information is used to notify the PCF network element that the notification control status of the third quality of service flow is the second state.

The first state is used to indicate that the quality of service requirement of the at least one quality of service flow cannot be met, and the second state is used to indicate that the quality of service requirement of the at least one quality of service flow can be met.

Optionally, the processor 1501 may be further configured to receive, using the transceiver 1502, seventh information sent by an AMF network element, where the seventh information includes an identifier of the second quality of service flow that has been handed over from the first access network device to the second access network device.

In a third possible design, the processor 1501 may be configured to determine that the at least one QoS flow is handed over from the first access network device to the second access network device. Then, the processor 1501 may be further configured to send eighth information to the PCF network element using the transceiver 1502, where the eighth information is used to indicate that the at least one QoS flow is handed over from the first access network device to the second access network device.

For steps performed by the processor 1501 and the transceiver 1502, refer to related descriptions in the steps performed by the SMF network element in the foregoing method Embodiment 1 to method Embodiment 4. Details are not described herein.

Figure 16:
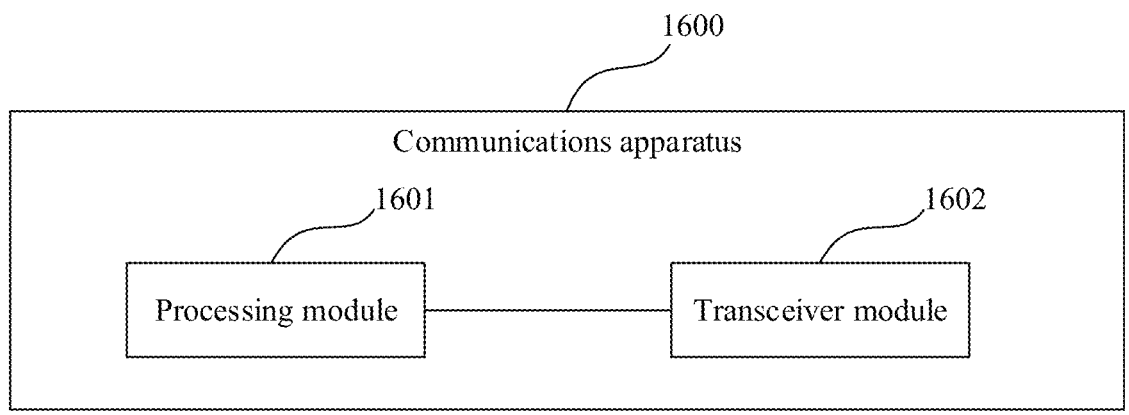

Alternatively, the communications apparatus 1500 may be implemented using logical units. FIG. 16 is a schematic structural diagram of a communications apparatus 1600 according to an embodiment of this application. The apparatus 1600 includes a processing module 1601 and a transceiver module 1602. The processing module 1601 corresponds to the processor 1501 in the foregoing communications apparatus 1500, and the transceiver module 1602 corresponds to the transceiver 1502 in the foregoing communications apparatus 1500. The processing module 1601 and the transceiver module 1602 may be respectively configured to implement corresponding functions of the SMF network element in any one of the foregoing method Embodiment 1 to method Embodiment 4. For an implementation process, refer to related descriptions in the foregoing method Embodiment 1 to method Embodiment 4 and the communications apparatus 1500. Details are not described herein.

An embodiment of this application provides another communications apparatus, and the communications apparatus has a function of implementing the PCF network element in the foregoing method Embodiment 4. For example, the communications apparatus includes a corresponding module, unit, or means for performing the steps in the foregoing method Embodiment 4 by the PCF network element. The function, the module, the unit, or the means may be implemented by software, or may be implemented by hardware, or may be implemented by hardware executing corresponding software.

Figure 17:
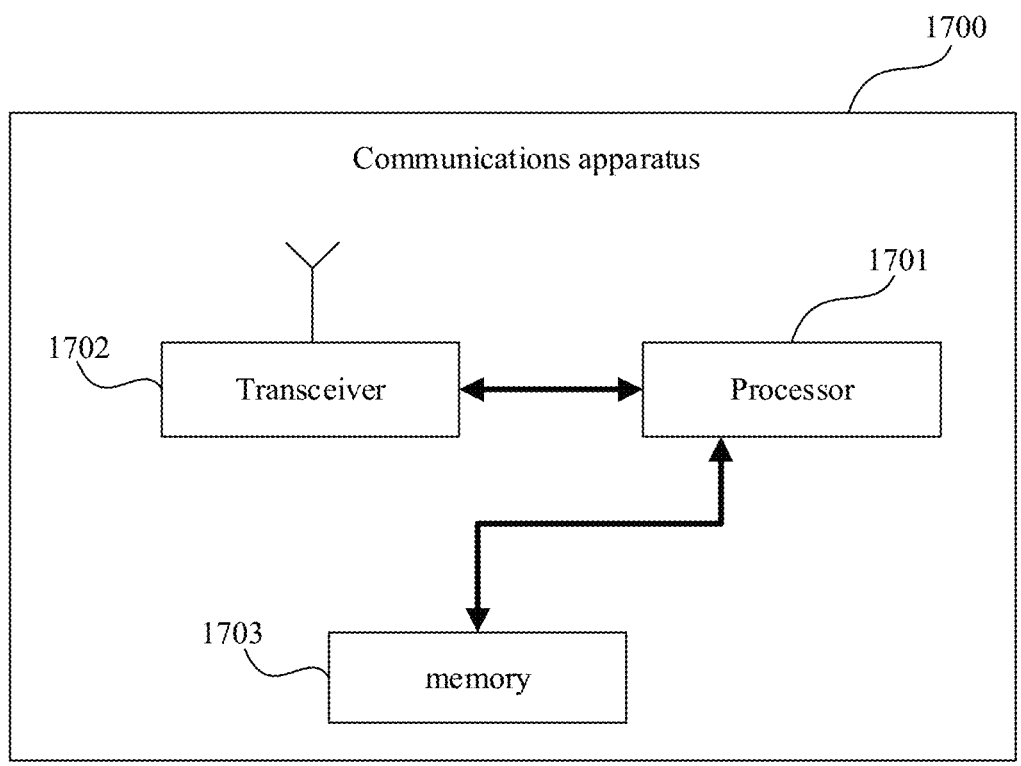

FIG. 17 is a schematic structural diagram of a communications apparatus 1700 according to an embodiment of this application. The apparatus 1700 includes a processor 1701 and a transceiver 1702. The processor 1701 is configured to support a PCF network element in performing the function in the foregoing method Embodiment 4. The transceiver 1702 is configured to support the PCF network element in performing a function of receiving and sending a message.

The apparatus 1700 may further include a memory 1703. The processor 1701, the transceiver 1702, and the memory 1703 are connected to each other. The memory 1703 is configured to store a computer program instruction required for implementing the function of the PCF network element in the foregoing method Embodiment 4. The processor 1701 is configured to execute the computer program instruction stored in the memory 1703, to control the transceiver 1702 to receive and send a signal, and complete a step of performing a corresponding function by the PCF network element in the foregoing method Embodiment 4.

For example, the processor 1701 may be configured to receive, using the transceiver 1702, eighth information sent by an SMF network element, where the eighth information is used to indicate that the at least one QoS flow is handed over from the first access network device to the second access network device. Then, the processor 1701 may determine a QoS flow whose notification control status is a first state in the at least one QoS flow, and update the notification control status of the determined QoS flow to a second state. The first state is used to indicate that a quality of service requirement of the determined QoS flow cannot be met, and the second state is used to indicate that the quality of service requirement of the determined QoS flow can be met.

For steps performed by the processor 1701 and the transceiver 1702, refer to related descriptions in the steps performed by the PCF network element in the foregoing method Embodiment 4. Details are not described herein.

Figure 18:
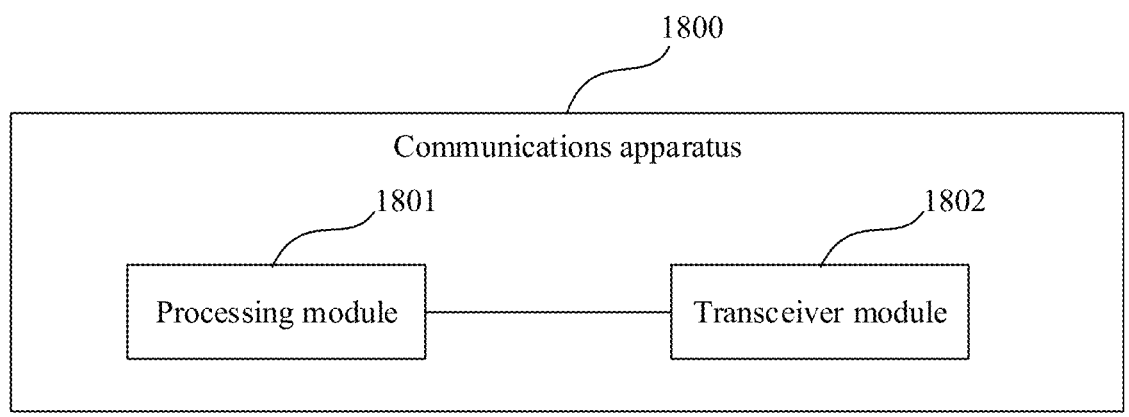

Alternatively, the communications apparatus 1700 may be implemented using logical units. FIG. 18 is a schematic structural diagram of a communications apparatus 1800 according to an embodiment of this application. The apparatus 1800 includes a processing module 1801 and a transceiver module 1802. The processing module 1801 corresponds to the processor 1701 in the foregoing communications apparatus 1700, and the transceiver module 1802 corresponds to the transceiver 1702 in the foregoing communications apparatus 1700. The processing module 1801 and the transceiver module 1802 may be respectively configured to implement corresponding functions of the PCF network element in the foregoing method Embodiment 4. For an implementation process, refer to related descriptions in the foregoing method Embodiment 4 and the communications apparatus 1700. Details are not described herein.

It may be understood that, in the accompanying drawings of the embodiments of this application, only simplified designs of the communications apparatuses are shown. In actual application, the foregoing communications apparatuses are not limited to the foregoing structures. For example, for the first RAN device or the second RAN device, a structure may further include an antenna array, a duplexer, a baseband processing part, and the like.

It should be noted that the processor in the embodiment of this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The memory may be integrated into the processor, or may be disposed separately with the processor.

According to the method provided in the embodiments of this application, an embodiment of this application further provides a communications system, where the communications system includes the foregoing first RAN device, the second RAN device, the SMF network element, and the PCF network element.

An embodiment of this application further provides a chip, where the chip is connected to a memory, and is configured to read and execute a software program stored in the memory, to implement any one of the methods in the foregoing method embodiments.

An embodiment of this application further provides a computer storage medium, where the computer storage medium stores a computer-readable instruction, and when reading and executing the computer-readable instruction, a computer may complete any one of the methods in the foregoing method embodiments.

An embodiment of this application further provides a computer program product including a software program, and when the computer program product runs on a computer, the computer is enabled to perform any one of the methods in the foregoing method embodiments.

A person skilled in the art should understand that the embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-readable storage media (including but not limited to a disk memory, an optical memory, and the like) that include a computer instruction.

The foregoing embodiments describe an objective, a technical method, and beneficial effects of this application in detail. It should be understood that the foregoing descriptions are only example implementations of this application, but are not intended to limit the protection scope of this application. Any modifications and variations made on a basis of the technical solutions of this application shall fall within the protection scope of this application.

What is claimed is:

1. A communication method, comprising:
determining, by a session management function (SMF) network element, a received notification control status that is of at least one quality of service flow and that is from a first access network device;
determining, by the SMF network element when a second quality of service flow in the at least one quality of service flow has been handed over from the first access network device to a second access network device, a third quality of service flow whose notification control status was a first state in the second quality of service flow, wherein the first state indicates that a quality of service requirement of the third quality of service flow cannot be met;
updating, by the SMF network element, the notification control status of the third quality of service flow to a second state, wherein the second state indicates that the quality of service requirement of the third quality of service flow can be met; and
sending sixth information to a policy control function (PCF) network element, wherein the sixth information is configured to notify the PCF network element that the notification control status of the third quality of service flow is the second state.

2. The communication method according to claim 1, further comprising receiving, by the SMF network element, seventh information from an access and mobility management function (AMF) network element, wherein the seventh information comprises an identifier of the second quality of service flow.

3. The communication method according to claim 1, further comprising receiving, by the PCF network element, the sixth information from the SMF network element.

4. The communication method according to claim 1, further comprising sending, by the SMF network element, third information to the PCF network element.

5. The communication method according to claim 4, wherein the third information is configured to trigger the PCF network element to update the notification control status.

6. The communication method according to claim 4, wherein the third information informs the PCF network element that the at least one quality of service flow has been successfully handed over.

7. The communication method according to claim 1, wherein at least one of the first access network device or the second access network device is a radio access network (RAN) device.

8. A communications apparatus, comprising:
a processor; and
a memory coupled to the processor and having program instructions stored thereon which, when executed by the processor, cause the communications apparatus to:
determine a received notification control status that is of at least one quality of service flow and that is from a first access network device;
determine, when a second quality of service flow in the at least one quality of service flow has been handed over from the first access network device to a second access network device, a third quality of service flow whose notification control status was a first state in the second quality of service flow, wherein the first state indicates that a quality of service requirement of the third quality of service flow cannot be met;
update the notification control status of the third quality of service flow to a second state, wherein the second state indicates that the quality of service requirement of the third quality of service flow can be met; and
send sixth information to a policy control function (PCF) network element, wherein the sixth information is configured to notify the PCF network element that the notification control status of the third quality of service flow is the second state.

9. The communications apparatus according to claim 8, wherein the program instructions, when executed by the processor, further cause the communications apparatus to receive seventh information from an access and mobility management function (AMF) network element, wherein the seventh information comprises an identifier of the second quality of service flow that has been handed over from the first access network device to the second access network device.

10. The communications apparatus according to claim 8, wherein the communications apparatus is a session management function (SMF) network element.

11. The communications apparatus according to claim 8, wherein the program instructions, when executed by the processor, further cause the communications apparatus to send third information to the PCF network element.

12. The communications apparatus according to claim 11, wherein the third information is configured to trigger the PCF network element to update the notification control status.

13. The communications apparatus according to claim 11, wherein the third information informs the PCF network element that the at least one quality of service flow has been successfully handed over.

14. A communications system, comprising:
- a policy control function (PCF) network element; and
- a session management function (SMF) network element configured to:
   - determine a received notification control status that is of at least one quality of service flow and that is from a first access network device;
   - determine, when a second quality of service flow in the at least one quality of service flow has been handed over from the first access network device to a second access network device, a third quality of service flow whose notification control status was a first state in the second quality of service flow, wherein the first state indicates that a quality of service requirement of the third quality of service flow cannot be met;
   - update the notification control status of the third quality of service flow to a second state, wherein the second state indicates that the quality of service requirement of the third quality of service flow can be met; and
   - send sixth information to the PCF network element, wherein the sixth information is configured to notify the PCF network element that the notification control status of the third quality of service flow is the second state,
- wherein the PCF network element is configured to receive the sixth information from the SMF network element.

15. The communications system according to claim 14, wherein the SMF network element is further configured to receive seventh information from an access and mobility management function (AMF) network element.

16. The communications system according to claim 15, wherein the seventh information comprises an identifier of the second quality of service flow that has been handed over from the first access network device to the second access network device.

17. The communications system according to claim 14, wherein at least one of the first access network device or the second access network device is a radio access network (RAN) device.

18. The communications system according to claim 14, wherein the SMF network element is further configured to send third information to the PCF network element.

19. The communications system according to claim 18, wherein the third information is configured to trigger the PCF network element to update the notification control status.

20. The communications system according to claim 18, wherein the third information informs the PCF network element that the at least one quality of service flow has been successfully handed over.

21. A communication method, comprising:
- determining, by a session management function (SMF) network element, a received notification control status that is of at least one quality of service flow and that is from a first access network device;
- determining, by the SMF network element when a second quality of service flow in the at least one quality of service flow has been handed over from the first access network device to a second access network device, a third quality of service flow whose notification control status was a first state in the second quality of service flow, wherein the first state indicates that a quality of service requirement of the third quality of service flow cannot be met;
- updating, by the SMF network element, the notification control status of the third quality of service flow to a second state, wherein the second state indicates that the quality of service requirement of the third quality of service flow can be met;
- sending sixth information to a policy control function (PCF) network element, wherein the sixth information is configured to notify the PCF network element that the notification control status of the third quality of service flow is the second state; and
- receiving, by the PCF network element, the sixth information from the SMF network element.

22. The communication method according to claim 21, further comprising receiving, by the SMF network element, seventh information from an access and mobility management function (AMF) network element.

23. The communication method according to claim 22, wherein the seventh information comprises an identifier of the second quality of service flow that has been handed over from the first access network device to the second access network device.

24. The communication method according to claim 21, wherein at least one of the first access network device or the second access network device is a radio access network (RAN) device.

25. The communication method according to claim 21, further comprising sending, by the SMF network element, third information to the PCF network element, wherein the third information triggers the PCF network element to update the notification control status.

* * * * *